(12) United States Patent
Fischer et al.

(10) Patent No.: US 11,204,679 B1
(45) Date of Patent: Dec. 21, 2021

(54) SNAPPING OBJECTS INTO ALIGNMENT IN THREE-DIMENSIONAL SPACE

(71) Applicant: Adobe Inc., San Jose, CA (US)

(72) Inventors: Alex Fischer, San Jose, CA (US); Jeanette Mathews, San Jose, CA (US); Erin Kim, San Jose, CA (US); Charles Pina, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/951,953

(22) Filed: Nov. 18, 2020

(51) Int. Cl.
*G06F 3/048* (2013.01)
*G06F 3/0481* (2013.01)
*G06F 3/0484* (2013.01)

(52) U.S. Cl.
CPC ...... *G06F 3/04815* (2013.01); *G06F 3/04845* (2013.01)

(58) Field of Classification Search
None
See application file for complete search history.

(56) References Cited

U.S. PATENT DOCUMENTS 6,498,607 B1 * 12/2002 Pfister ................. G06T 17/20
345/421
2002/0033845 A1 * 3/2002 Elber .................. G06T 17/00
715/764
2016/0098165 A1 * 4/2016 Baszucki ........... G06F 3/04815
715/769

OTHER PUBLICATIONS

Apple Inc., "Arranging Elements in a Scene", https://developer.apple.com/documentation/realitykit/creating_3d_content_with_reality_composer/arranging_elements_in_a_scene, 2020, 4 pages.

* cited by examiner

*Primary Examiner* — William C Trapanese
(74) *Attorney, Agent, or Firm* — Kilpatrick Townsend & Stockton LLP

(57) ABSTRACT

Operations of a method include accessing a first object and a second object positioned in virtual three-dimensional (3D) space. The operations further include moving the first object from a first position to a second position, responsive to a user request. The operations include computing a ray extending from a reference point of the first object, in the second position, in a direction of a first dimension. The operations include computing a pixel distance in screen space between a first plane of a first bounding box of the first object and a second plane of a second bounding box of the second object along the ray. Additionally, the method includes snapping the first object into alignment by moving the first object an additional distance to position a face of the first bounding box into the second plane, based on the pixel distance being no greater than an error value.

20 Claims, 17 Drawing Sheets

SNAPPING OBJECTS INTO ALIGNMENT IN THREE-DIMENSIONAL SPACE

TECHNICAL FIELD

This disclosure generally relates to computer graphics. More specifically, but not by way of limitation, this disclosure relates to automatically snapping objects into alignment in three-dimensional space.

BACKGROUND

Various computer applications and programs offer functionality that allows a user to position objects in virtual space. For instance, computer-aided design (CAD) is a computer technology that aids a user in creating, modifying, or analyzing two- or three-dimensional models, where such a model can include one or more objects as parts. CAD systems and other image-editing applications are used for various purposes, such as for designing mechanical objects as well as larger objects such as bridges and stadiums. The output of such an image-editing application can be used for machining, for reference when building a real-life object, or for other purposes.

An image-editing application, such as a CAD system, provides controls as part of an interface, and such controls are used to manipulate objects into different positions. For instance, such image-editing applications often provide a snapping feature, whereby two objects in a two-dimensional space snap into alignment in one of the two dimensions when the user moves one of such objects close enough to alignment with the other. Snapping is a useful tool that enables a user to align objects without having to precisely manipulate a mouse, stylus, or other implement to place objects into the desired alignment.

However, snapping is not typically implemented in three dimensions. Three-dimensional space presents some challenges that do not exist when manipulating objects in two-dimensional space. For instance, snapping is dependent on the distance between objects; when operating within two dimensions, an image-editing application snaps objects into alignment when those objects are brought close enough into alignment such that it can be assumed that the user desires alignment. In three dimensions, however, the perceived closeness of two objects is dependent on camera perspective, since the world space in which objects reside is viewed from a specific, changeable angle. For instance, by moving a camera, the perceived distance between objects can change due to parallax, obstructions, or camera distance or zoom level. Unpredictable results could occur due to a user being unsure how closely objects need to be brought into alignment to initiate a snap, thus resulting in unwanted snaps or difficulty in initiating snaps.

SUMMARY

In one embodiment, one or more processing devices of a computing system perform operations to automatically align objects in three-dimensional (3D) space. The operations include accessing respective definitions of a first object and a second object, where each such object is positioned in a virtual 3D space and each such object has a respective bounding box. The computing system detects a user interaction in which a user interacts with the first object to move the first object from a first position in the virtual 3D space to a second position. Responsive to this movement, the computing system determines whether to automatically align, or snap, the first object with the second object during the user interaction.

For instance, while the user interaction is ongoing, the computing system computes a ray extending from a reference point of the first object, in the second position, in a direction of a first dimension in a world coordinate system of the virtual 3D space. The computing system computes a pixel distance in screen space between a first plane of a bounding box of the first object and a second plane of the bounding box of the second object along that ray. If the computing system determines that the pixel distance is no greater than an error value, the computing system snaps the first object into alignment with the second object by moving the first object an additional distance to position a face of the bounding box into the second plane.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
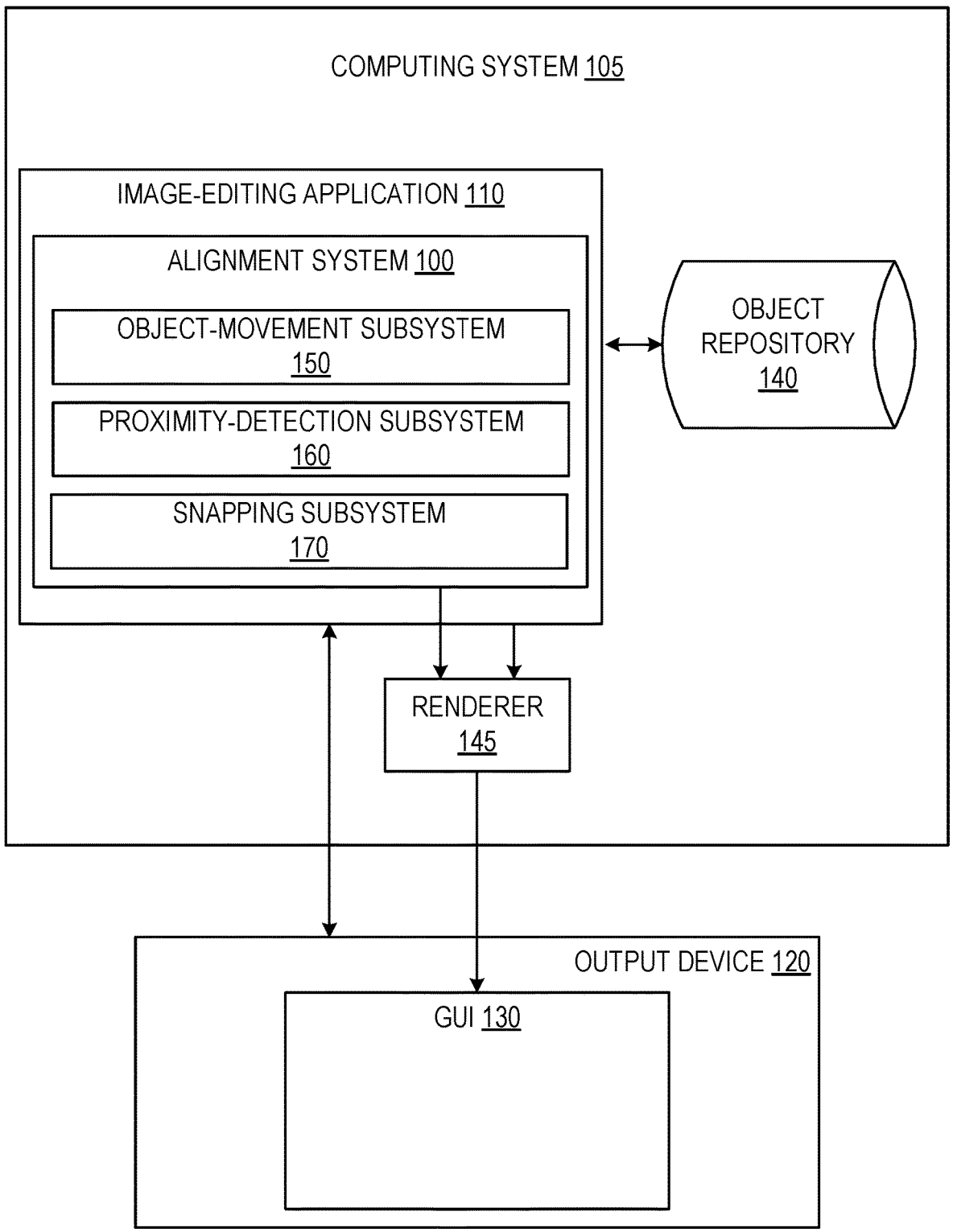
FIG. 1 is a diagram of an example of an alignment system executing on a computing system, according to some embodiments described herein.

The present disclosure includes systems and methods for automatically snapping objects into alignment in three-dimensional (3D) space. Embodiments described herein facilitate object snapping in, for example, cases in which a user interacts with such objects using a device that captures user inputs in a two-dimensional (2D) space, such as a mouse, track pad, or touchscreen. As explained above, conventional snapping techniques typically do not enable snapping objects into alignment in 3D space. Embodiments described herein address these issues by providing an intuitive technique for snapping objects into alignment in three dimensions. Specifically, in three dimensions, a computing system snaps an object into alignment with another, based on bounding boxes of the objects or based on center points of the objects, by evaluation of the two-dimensional projection of a ray that extends from a reference point of the object outward along a dimension of the 3D space. Additionally, some embodiments include an option to require potential contact between objects as a condition for snapping.

The following non-limiting example is provided to introduce certain embodiments. In this example, an alignment system is operable to manipulate objects in virtual 3D space, also referred to as simply 3D space, by snapping such objects into alignment based on the objects' respective bounding boxes or center points. In this example, the alignment system accesses a first object and a second object in a virtual 3D space. For instance, descriptions of the first object and the second object are stored on a storage device, and the alignment system accesses those descriptions from storage device to determine the locations, shapes, or other aspects of the first object and the second object in the 3D space). The descriptions of the first object and the second object include their respective coordinates in a world coordinate system (e.g., a set of planes defined by an x-axis, a y-axis, and a z-axis) that defines the 3D space. Each of the first object and the second object has a respective bounding box, which the alignment system computes or otherwise accesses.

In this example, the alignment system receives a user request to move the first object along a movement plane from a first position to a second position. The alignment system thus modifies the stored description of the first object to indicate that the first object is now located at the second position in the 3D space. Additionally, in this example, the alignment system detects whether a pixel distance between the first and second objects is within an error value of alignment with the second object. In particular, the error value indicates a degree to which the first bounding is in alignment with the bounding box of the second object.

In this example, the alignment system performs such a detection by computing a 3D ray from a reference point of the first object (e.g., a local origin of the first object) outward in a first dimension of the 3D space (i.e., parallel to an axis associated with the first dimension). The alignment system computes an intersection of the ray with the bounding box of the first object. The alignment system additionally computes the closest intersection of that ray with a respective plane in which any face (i.e., side) of the bounding box of the second object fully lies. Given these two intersections, the alignment system thereby computes a 3D segment between the two intersections, which is taken as a segment between the bounding box of the first object and a plane of the bounding box of the second object. The segment has a 2D projection onto screen space, which is the 2D space viewed by a user from a camera perspective of the 3D space. The alignment system computes the pixel length of that 2D projection. The pixel length of the 2D projection is a pixel distance between the bounding box of the first object and a plane of the bounding box of the second object. If that pixel distance is no more than the error value, then the alignment system moves the first object an additional distance to snap the first object into alignment with the second object. More specifically, the alignment system snaps the bounding box of the first object into the plane of the bounding box of the second object, thereby bringing the first object and the second object into alignment in the first dimension of the 3D space (i.e., the dimension corresponding to the direction of the ray).

Certain embodiments described herein facilitate three-dimensional modeling by enabling a user to intuitively snap 3D objects into alignment in 3D space. A challenge of modeling in 3D space is the inability to predictably snap objects into alignment given two-dimensional implements and given a camera perspective that impacts pixel distances between objects in screen space. Some embodiments described herein, however, improve existing image-editing and modeling techniques through a process that is partially dependent on the projection of distances into screen space, thus enabling predictability given that a user views a 3D space through the projected screen space.

Referring now to the drawings, FIG. 1 is a diagram of an example of an alignment system 100 executing on a computing system 105, according to some embodiments described herein. The directions of the various arrows shown in FIG. 1 illustrate an example communications flow; however, these directional arrows are provided for illustrative purposes only and do not limit the various embodiments described herein. The alignment system 100 provides one or more controls for automatically snapping objects into alignment in a world space, which is a depicted 3D space, responsive to modification of such objects, specifically, responsive to moving one or more of such objects in the world space. In some embodiments, as shown in the example of FIG. 1, the alignment system 100 is integrated into an image-editing application 110, such as a modeling system. As such, when a user of the image-editing application 110 utilizes the image-editing application to move an object, the alignment system is configured to snap that object into alignment with another object in the world space when certain criteria are met.

The embodiment depicted in FIG. 1 is merely an example and is not intended to unduly limit the scope of claimed embodiments. One of ordinary skill in the art would recognize many possible variations, alternatives, and modifications. For example, in some embodiments, more or fewer systems or components than those shown in FIG. 1 are provided, two or more systems or components are combined, or a different configuration or arrangement of systems and components are provided. In some embodiments, the systems, subsystems, and other components depicted in FIG. 1 are implemented in software (e.g., program code or instructions) executed by one or more processing units (e.g., processors, cores), in hardware (e.g., as a specialized hardware circuit installed on the computing system 105), or combinations thereof. For instance, the software is stored on a non-transitory storage medium such as a memory device. In the embodiment depicted in FIG. 1, the alignment system 100 runs on the computing system 105. The computing system 105 is, for example, a single computing device or is a distributed system of computing devices. The alignment system 100 may be implemented by one or more computing systems of a cloud service provider infrastructure. The computing system 105 can be of various types including but not limited to a consumer device such as a desktop computer, a notebook computer, a tablet, or a smartphone.

In some embodiments, the alignment system 100 is implemented as program code installed on such a consumer device. As shown in FIG. 1, an embodiment of the alignment system 100 is integrated into an application 110 running on the computing system 105. Additionally or alternatively, however, the alignment system 100 is separate from the application 175 but in communication with the application 175 to provide the operations described herein through the application 175. Throughout this disclosure, it will be understood that operations described herein as performed by the image-editing application 110 can be performed by the alignment system 100 and that operations described as being performed by the alignment system 100 can be performed by the image-editing application 110.

In some embodiments, as shown in FIG. 1, the computing system 105 includes, or otherwise has access to, an object repository 140, accessible by the alignment system 100. The object repository 140 maintains objects, more specifically, definitions of objects that exist in the world space displayed by the image-editing application. The object repository 140 is, for example, a database, one or more tables of a database, one or more text files, or one or more other storage objects. For instance, the object repository 140 is a portion of a storage device of the computing system 105. As stored in the object repository 140, a definition of an object could take various forms. Such a definition describes, for instance, the size, shape, and position of a corresponding object. For instance, each object is represented as a definition in the form of a data structure or a row in a table. In one example, if an object is a polyhedron, such as a rectangle, then the object is stored as one or more ordered sets of vertices, each set defining a face of the polyhedron. In another example, if the object is not a polyhedron but a more complex shape, then the object is stored as one or more functions (e.g., parametric functions) or as one or more sets of arcs and segments. It will be understood that various techniques for storing definitions of objects are within the scope of this disclosure. The alignment system 100 accesses the object repository 140, for instance, to determine the positions of objects based on movement of one or more objects and, further, to update such positons as needed to implement snapping such objects into alignment.

In some embodiments, the computing system 105 also includes a renderer 145, which generates an image, also referred to as a render, for display to an output device 120. The render is, for instance, a 2D projection of the world space, including objects in the world space, given a particular camera perspective of the world space. In one embodiment, the renderer 145 is or utilizes a GPU installed on the computing system 105. For instance, to utilize the renderer 145, the image-editing application 110 or the alignment system 100 sends to the GPU a set of commands for displaying the world space, including the objects in the world space, and the GPU follows the commands to generate the render for output.

In some embodiments, an output device 120 displays a render, specifically, a render of the world space given a current camera perspective of that world space. That render includes a graphical user interface (GUI) 130, which shows the world space, including any objects in the world space that would be visible given the camera perspective, and also acts as an interface for user interactions. The output device 120 can take various forms. For instance, the output device 120 is a printer or a display monitor, or the output device 120 is a separate computing device, such as a smartphone, tablet, or personal computer, with which the computing system 105 communicates to display the GUI on such separate computing device. In one embodiment, for instance, the computing system 105 on which the alignment system 100 runs provides a cloud-based service, and the output device 120 is a consumer device utilizing the cloud-based service such that the computing system 105 causes such consumer device to display a render of the world space.

As shown in FIG. 1, an embodiment of the alignment system 100 includes an object-movement subsystem 150, a proximity-detection subsystem 160, and a snapping subsystem 170. Generally, in some embodiments, the object-movement subsystem 150 receives an indication of movement of objects, which includes causing such movements as part of the image-editing application 110. The proximity-detection subsystem 160 detects that an object to should snap into alignment with another object due to having been moved sufficiently close to being aligned with the other object. The snapping subsystem 170 implements such snapping by causing one or both objects to move an additional amount so as to come into alignment. Although the object-movement subsystem 150, the proximity-detection subsystem 160, and the snapping subsystem 170 are depicted as being distinct components, this depiction is for illustrative purposes only, and the object-movement subsystem 150, the proximity-detection subsystem 160, and the snapping subsystem 170 can share hardware, software, or a combination of both.

Figure 2:
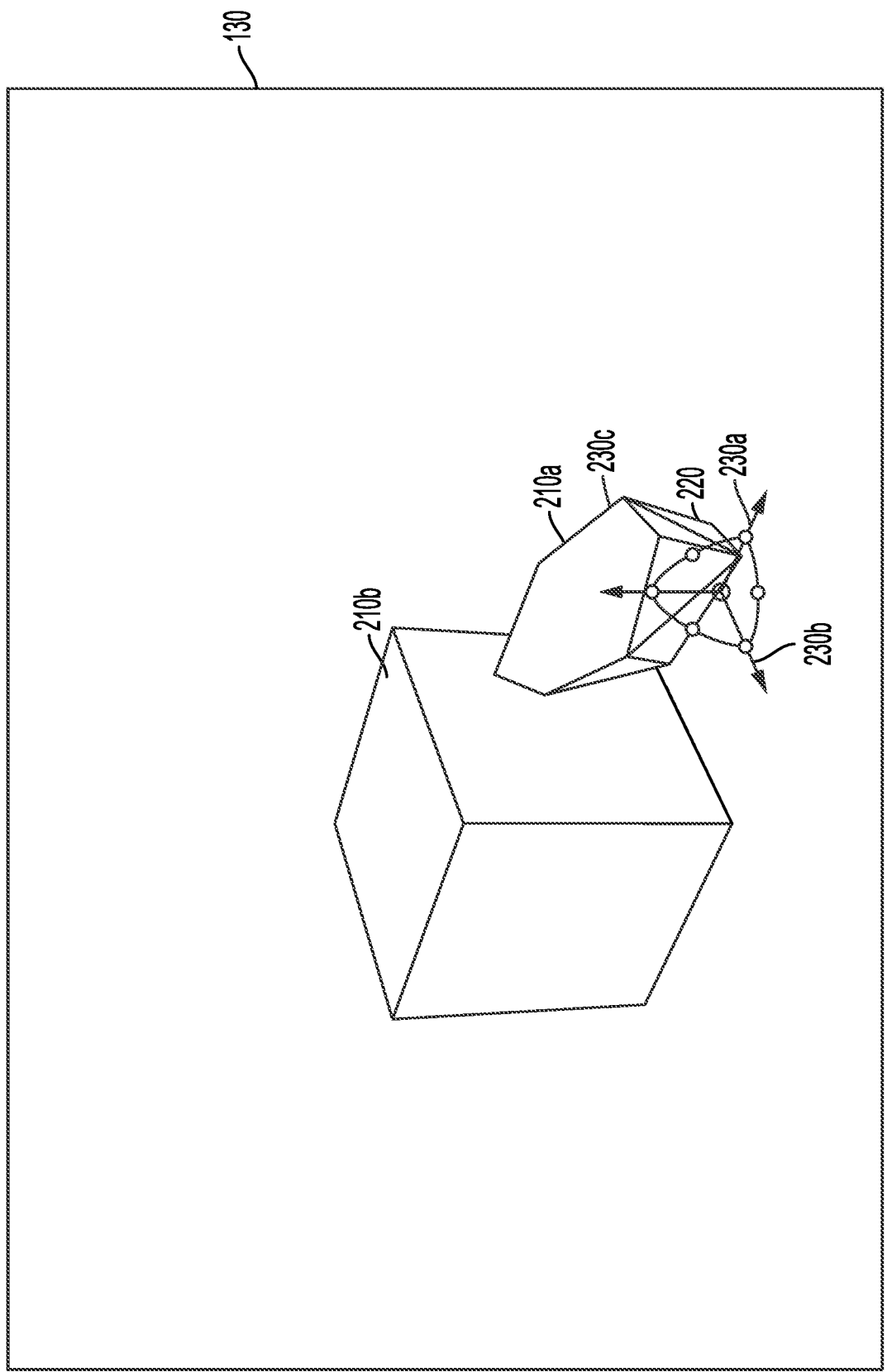
FIG. 2 shows an example of a graphical user interface (GUI) of the alignment system in which a first object and a second object are visible, according to some embodiments described herein.

FIG. 2 shows an example of a GUI 130 of the alignment system 100 in which a first object 210a and a second object 210b are visible in the world space, according to some embodiments described herein. As shown in FIG. 2, the objects, such as the first object 210a and the second object 210b, in the world space are 3D and each have a respective position in the world space. In some embodiments, the world space has a coordinate system referred to herein as a world coordinate system, and each object has a position defined within the world coordinate system. Additionally, each object has a respective local coordinate system, which can be defined based on how the object was originally created, and which may or may not align with the world coordinate system.

The example GUI 130 of FIG. 2 shows a widget 220, with which the user can interact to modify (e.g., change the position of) the first object 210*a*. However, use of the widget 220 need not be the only mechanism available to the user for modifying the first object 210. In some embodiments, the image-editing application 110 causes the widget to be displayed responsive to a user selecting the first object 210*a*. In some embodiments, as in this example, the widget 220 illustrates a local coordinate system of the first object 210*a*. In this example, the local coordinate system is aligned with the world coordinate system such that the x-dimension of the first object 210*a* is the x-dimension of the world space, the y-dimension of the first object 210*a* is the y-dimension of the world space, and the z-dimension of the first object 210*a* is the z-dimension of the world space.

In some embodiments, the widget 220 shows a set of axes of the local coordinate system of the first object 210*a* to which the widget 220 applies. Specifically, the widget 220 shows a first axis 230*a* corresponding to a first dimension in the local coordinate system, a second axis 230*b* corresponding to a second dimension in the local coordinate system, and a third axis 230*c* corresponding to a third dimension in the local coordinate system. In this example, the first dimension, the second dimension, and the third dimension in the local coordinate system are the same as the first dimension, the second dimension, and the third dimension in the world coordinate system, but that need not be the case. To move an object, the user can select an axis of the respective widget 220 for that object and can drag that axis. As a result, the image-editing application 110 causes the object to move along the dimension corresponding to the axis by an amount corresponding to the length of the drag. A user typically interacts with an image-editing application using an implement such as a mouse, a track pad, or a touchscreen, all of which allow two-dimensional interactions that must be translated into three-dimensional manipulations. The widget 220 provides a two-dimensional interface, controllable with these implements, which are also two-dimensional, that enables the user to intuitively make manipulations in three dimensions.

In this example, the user can interact with the first axis 230*a* of the widget 220 to move (i.e., to request movement thereby prompting the image-editing application to move) the first object 210*a* in the first dimension; the user can interact with the second axis 230*b* of the widget 220 to move (i.e., to request movement thereby prompting the image-editing application to move) the first object 210*a* in the second dimension; and the user can interact with the third axis 230*c* of the widget 220 to move (i.e., to request movement thereby prompting the image-editing application to move) the first object 210*a* in the third dimension. Other techniques for moving objects are also possible in certain embodiments and are within the scope of this disclosure.

As described below, the user can request movement of the first object 210*a*, such as through use of the widget 220 or otherwise. Responsive to the first object 210*a* moving to a position that is sufficiently close to the second object 210*b*, the alignment system 100 may move the first object 210*a* an additional amount to align the first object 210*a* with the second object 210*b*.

Figure 3:
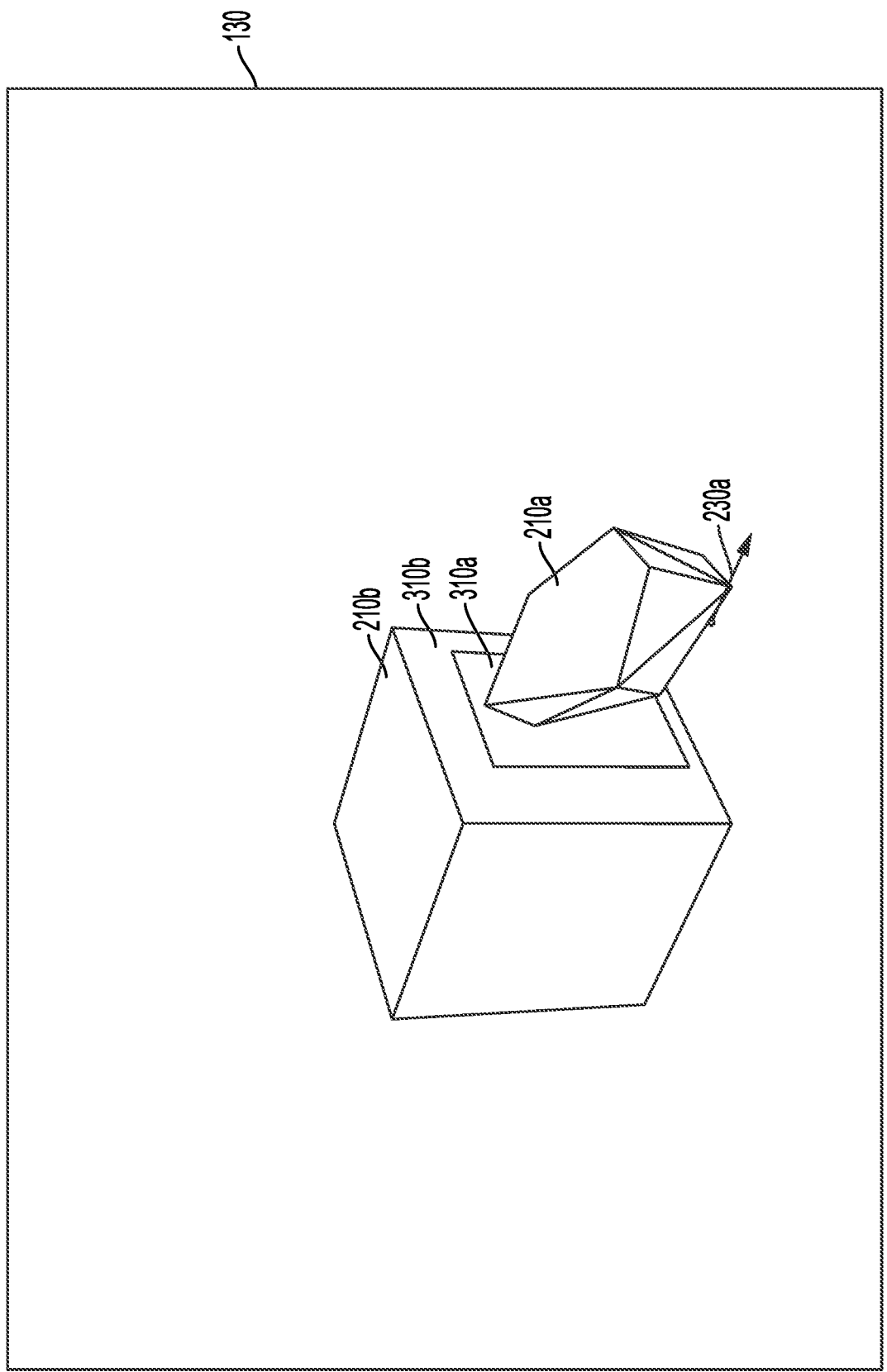
FIG. 3 shows an example of the GUI in which the first object and the second object of FIG. 2 are snapped into alignment based on their bounding boxes, according to some embodiments described herein.

FIG. 3 shows an example of the GUI 130 in which the first object 210*a* and the second object 210*b* of FIG. 2 are snapped into alignment based on their bounding boxes, according to some embodiments described herein. Specifically, FIG. 3 shows a result of moving the first object 210*a* from its position in FIG. 2 to a second position deemed close enough to the second object 210*b* such that the alignment system 100 snaps the first object 210*a* into alignment with the second object 210*b*.

In the example of FIG. 2 and FIG. 3, given the positions of the first object 210*a* and the second object 210*b* in FIG. 2, a user requested movement of the first object 210*a* in a first dimension corresponding to a first axis 230*a*. Specifically, this movement was toward the second object 210*a*. As shown in FIG. 3, an embodiment of the alignment system 100 determines that the second position of the first object 210*a* is sufficiently close to alignment with the second object 210*b* such that a snap operation should occur. A snap operation may involve automatically moving the first object 210*a* an additional amount to bring the first object 210*a* into alignment with the second object 210*b*.

Specifically, in this case, the alignment to which the first object 210*a* is deemed sufficiently close as an alignment of a first face 310*a* of a first bounding box of the first object 210*a* with a second face 310*b* of a second bounding box of the second object 210*b*. These respective faces of the first bounding box and the second bounding box are considered aligned when they have the same value in some dimension of the world space or, in other words, share a plane perpendicular to an axis in the world space. In this example, the first object 210*a* was moving along the first dimension. Based on the movement to the second position, the alignment system 100 determines that the first face 310*a* of the first bounding box is now sufficiently close to the plane of the second face 310*b* of the second bounding box, and thus, the alignment system 100 performs the snap operation to bring the first face 310*a* of the first bounding box into that plane, such that the first face 310*a* of the first bounding box and the second face 310*b* of the second bounding box now share that same plane perpendicular to the first dimension and, further, now share the same value (i.e., position) in the first dimension.

In some embodiments, the detection of sufficient closeness and the snapping (i.e., the additional movement of the first object 210*a*) occur while the user is still interacting with the first object 210*a* and, further, still requesting movement of the first object 210*a*. In other words, for instance, the user is continuing to drag or hold the first axis 230*a* on the widget 220, such that the user has not released the first object 210*a* into the second position. As a result, snapping occurs while the user's interaction to facilitate movement of the first object 210*a* is ongoing. This ongoing interaction is interpretable by the alignment system 100 as a request to snap the first object 210*a* into alignment with another object if the first object 210*a* is sufficiently close to such alignment. When the user ends the interaction, the alignment system 100 need no longer decide whether to perform a snap operation (i.e., to snap the first object 210*a* into alignment with another object) and need not perform any further snap operation on the first object 210*a* at that time.

In this example, the snap operation moves the first bounding box into direct contact with the second bounding box; however, other examples will show that this need not be the case. Rather, in some embodiments, alignment is achieved through a shared plane, regardless of whether bounding boxes are in direct contact. Certain other embodiments, however, may require contact as a criterion for performance of a snap operation.

Further, as will be shown by other examples, alignment need not be defined based on bounding boxes. In the above example, alignment is defined as bounding boxes having respective sides sharing a plane with a common value in a dimension of the world space. In other examples, however, alignment is defined as respective center points of objects sharing a plane with a common value in a dimension of the world space. In either case, an embodiment of the alignment system 100 determines whether a first object 210*a* with which the user is interacting is sufficiently close to meeting the definition of alignment with another object, such that the first object 210*a* should be snapped into such alignment. The definition of "sufficiently close" in this context will be described in detail later in this disclosure.

Figure 4:
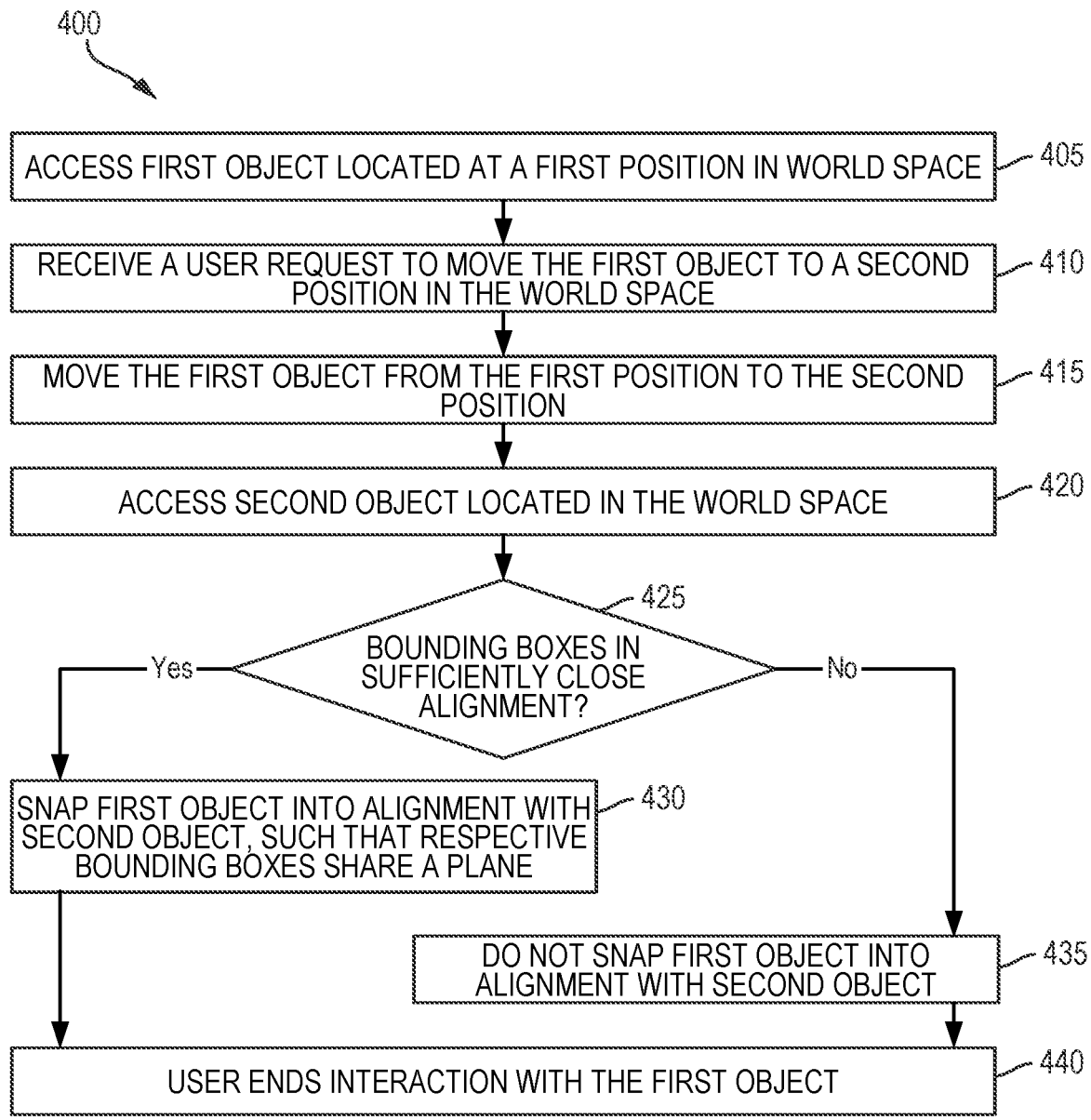
FIG. 4 is a diagram of an example of a process of snapping objects into alignment based on their bounding boxes, according to some embodiments described herein.

FIG. 4 is a diagram of an example of a process 400 of snapping objects into alignment based on their bounding boxes, according to some embodiments described herein. More specifically, this process 400 may be used by an embodiment of the alignment system 100 to snap an object with which a user is interacting into alignment with another object. The process 400 depicted in FIG. 4, as well as other processes described herein, may be implemented in software executed by one or more processing units, in hardware, or in a combination software and hardware. This process 400 is intended to be illustrative and non-limiting. Although FIG. 4 depicts various activities occurring in a particular sequence or order, this is not intended to be limiting. In certain embodiments, for instance, the activities may be performed in a different order, or one or more activities of the process 400 may be performed in parallel.

As shown in FIG. 4, at block 405 of the process 400, an embodiment of the alignment system 100 accesses a first object 210*a* located at a first position in a virtual three-dimensional (3D) space (i.e., a world space). In some embodiments, for instance, the alignment system 100 accesses a definition of the first object 210*a* as stored in an object repository 140. The definition indicates a shape of the first object 210*a* and a position of the first object 210*a* in the world space. The first object 210*a* has a first bounding box, which fully contains the first object 210*a*; for example, the first bounding box is a minimum bounding box for the first object 210*a*. The alignment system 100 computes the first bounding box, or alternatively, the alignment system 100 accesses a description of the first bounding box, which, for instance, is stored in the object repository 140.

At block 410 of the process 400, an embodiment of the alignment system 100 receives a request to move the first object 210*a* from a first position (e.g., the current position of the first object 210*a*) to a second position along a movement plane. For instance, this request may be made by the user through the user's interaction with a widget 220 associated with the first object 210 or through some other interaction with the GUI 130 or input devices of the computing system 105. In some cases, the requested movement is along a direction vector, such as when the request indicates movement in a single dimension, or the movement is along a plane in multiple dimensions, such as the ground plane. In the latter case, the movement plane is defined as the plane along which the first object 210*a* is to be moved as requested. However, if the requested movement is restricted to a direction vector (e.g., to a single axis), an embodiment of the alignment system 100 computes the movement plane based on the direction of the direction vector and further based on the current camera view. The origin of the movement plane in that case is a reference point (e.g., a local origin of the first object 210*a* or an interaction point at which the user is interacting with the first object 210*a*). The alignment system 100 computes the normal of the movement plane as the cross product of the camera forward vector with the direction vector, further crossed with the direction vector again. However, in some cases, the alignment system 100 need not explicitly compute the movement plane to perform the computations described herein.

In some embodiments, the user interaction interpreted as the request to move the first object 210*a* is ongoing while the below operations of block 415, block 420, decision block 425, block 430, and block 435 are performed. For instance, the user may retain the selection of the first object 210*a*, such as by keeping a mouse button depressed or by keeping a stylus or other implement in contact with a touchscreen. The snap operation described below may be performed while this user interaction is ongoing and, in some embodiments, stops when the interaction ends, regardless of whether a snap has been completed.

At block 415 of the process 400, responsive to the request, the object-movement subsystem 150 of the alignment system 100 may cause the first object 210*a* to move from the first position to the second position. For example, in some embodiments, the alignment system 100 updates the definition of the first object 210*a* (e.g., in the object repository 140) to indicate that the first object 210*a* is located at the second position in the world space, and as a result, the renderer 145 then renders the first object 210*a* at the second position.

At block 420 of the process 400, the alignment system 100 may access a second object 210*b* located at a respective position in the world space. In some embodiments, accessing the second object 210*b* occurs in the same manner or a similar manner in which the alignment system 100 accessed the first object 210*a*. For instance, the alignment system 100 retrieves a definition of the second object 210*b* from the object repository, where that definition includes a shape and location of the second object 210*b*. Like the first object 210*a*, the second object 210*b* has a respective bounding box, referred to as the second bounding box. The alignment system 100 computes the second bounding box based on the definition of the second object 210*b*, or the alignment system 100 accesses a description of the second bounding box as precomputed or as computed by some other component.

Blocks 425-440, in some embodiments, implement a step for snapping the first object into alignment with the second object based a distance in a given dimension, along a ray extending from the first object as moved, between the first bounding box and the second bounding box. As described below, an embodiment the alignment system 100 will determine whether the first object 210*a*, as moved, is sufficiently close to alignment with the second object 210*b*. Specifically, for instance, the proximity-detection subsystem 160 of the alignment system 100 makes this determination. Although this example of a process 400 determines whether the first object 210*a*, as moved, is sufficiently aligned only with the second object 210*b*, an embodiment of the alignment system 100 may make such determination with respect to multiple objects rather than with respect to only a single object (i.e., the second object 210*b*). In other words, in such embodiments, the alignment system 100 accesses multiple objects at block 420 of the process 400, and the alignment system 100 considers whether the first object 210*a*, as moved, is sufficiently close to any or all of such multiple objects as described below with respect to the second object 210*b*. Determination of which object to snap to in that case will be described in detail later in this disclosure.

At decision block 425, the process 400 involves detecting whether the first object 210*a*, as moved, is sufficiently close to alignment with the second object 210*b* with respect to the bounding boxes of the first object 210*a* and the second object 210*b*. In some embodiments, to this end, as described below in more detail, the alignment system 100 computes a respective ray corresponding to each dimension of the world space. For a given dimension, the respective ray originates at a reference point associated with the first object 210a and is directed parallel to the world space axis corresponding to that dimension. At least one of such rays intersects a plane of the second bounding box (i.e., a plane in which a face 310b of the first bounding box fully lies) of the second object 210b. For such a ray, an embodiment of the alignment system 100 computes a first intersection at which the ray intersects the plane of the first bounding box and computes a second intersection, which is the closest intersection between the ray and a plane of the second bounding box (i.e., a plane in which a face 310b of the second bounding box 310b fully lies). The alignment system 100 computes a pixel length of the segment between the first intersection and the second intersection or, in other words, a pixel distance between a plane of the first bounding box and the closest plane of the second bounding box along the ray. Because the ray, and thus this segment, is in 3D space, the alignment system 100 projects the segment onto screen space to compute this pixel distance. If multiple such rays intersect planes of the second bounding box, the remaining blocks of this process 400 apply to the ray resulting in the smallest such pixel distance.

In some embodiments, the alignment system 100 utilizes an error value, or threshold, to determine whether the first object 210a has been moved into a position that is sufficiently close to alignment with the second object 210b. Specifically, for instance, if the pixel distance described above is no more than the error value, then an embodiment of the alignment system 100 deems the first object 210a, as moved, to be sufficiently close to alignment with the second object 210b. In this example, alignment is defined as the first bounding box having a face that falls fully within a plane of the second bounding box 310b.

In some embodiments, the use of the pixel distance rather than a distance in world space has various benefits. For instance, because a user views the world space through a 2D display (i.e., through the screen space), the user can more clearly intuit pixel distance in screen space as compared to distance in world space. As a result, the user can more intuitively determine how to make objects snap into alignment, as doing so requires moving an object to be within a particular pixel distance of another object, and pixel distance is easy for the user to see when viewing the objects on a display. Further, the use of pixel distance enables greater consistency with respect to initiating a snap operation because, if using world space distance, the perception of that world space distance could change as the camera perspective changes. In contrast, pixel distance is more easily distinguishable and measurable by a user's naked eye.

If the first object 210a, as moved to the second position, is deemed sufficiently close to alignment with the second object 210b (e.g., if the pixel distance is no greater than an error value), then the process 400 proceeds to block 430. Otherwise, if the first object 210a is deemed to not be sufficiently close to such alignment, then the process 400 skips ahead to block 435.

At block 430, the first object 210a has been deemed sufficiently close to alignment with the second object 210b. As such, the process 400 involves snapping the first object 210a into alignment with the second object 210b by moving the first object 210a an additional amount toward the second object 210b. In some embodiments, for instance, the snapping subsystem 170 of the alignment system 100 causes the first object 210a to move along the ray computed at decision block 425 for a distance corresponding to the pixel distance computed at decision block 425. In other words, the first object 210a is moved along the ray into alignment with the second object 210b.

At block 435, the first object 210a has been deemed not sufficiently close to alignment with the second object 210b. As such, the process 400 involves not snapping the first object 210a into alignment with the second object 210b. In other words, an embodiments of the alignment system 100 allows the first object 210a to remain at the second position to which the user requested that the first object 210a be moved.

At block 440, regardless of the whether the snap operation was performed, the user ends the interaction with the first object 210a at some point. In some embodiments, the first object 210a is thus aligned with the second object 210b if the snap operation occurred (e.g., if block 430 was executed) or not (e.g., if block 435 was executed).

As shown with respect to FIG. 2 and FIG. 3, snapping can occur to bring two objects into contact with each other. Further, some embodiments can require potential contact as a criterion for a snap operation, in which case, for instance, the alignment system 100 performs a snap operation if a first object 210a is sufficiently close to alignment and contact with the second object 210b. Such requirement is optional in some embodiments, such that the user can decide whether resulting contact is required for a snap operation. However, alignment need not refer to contact, as illustrated by the following examples.

Figure 5:
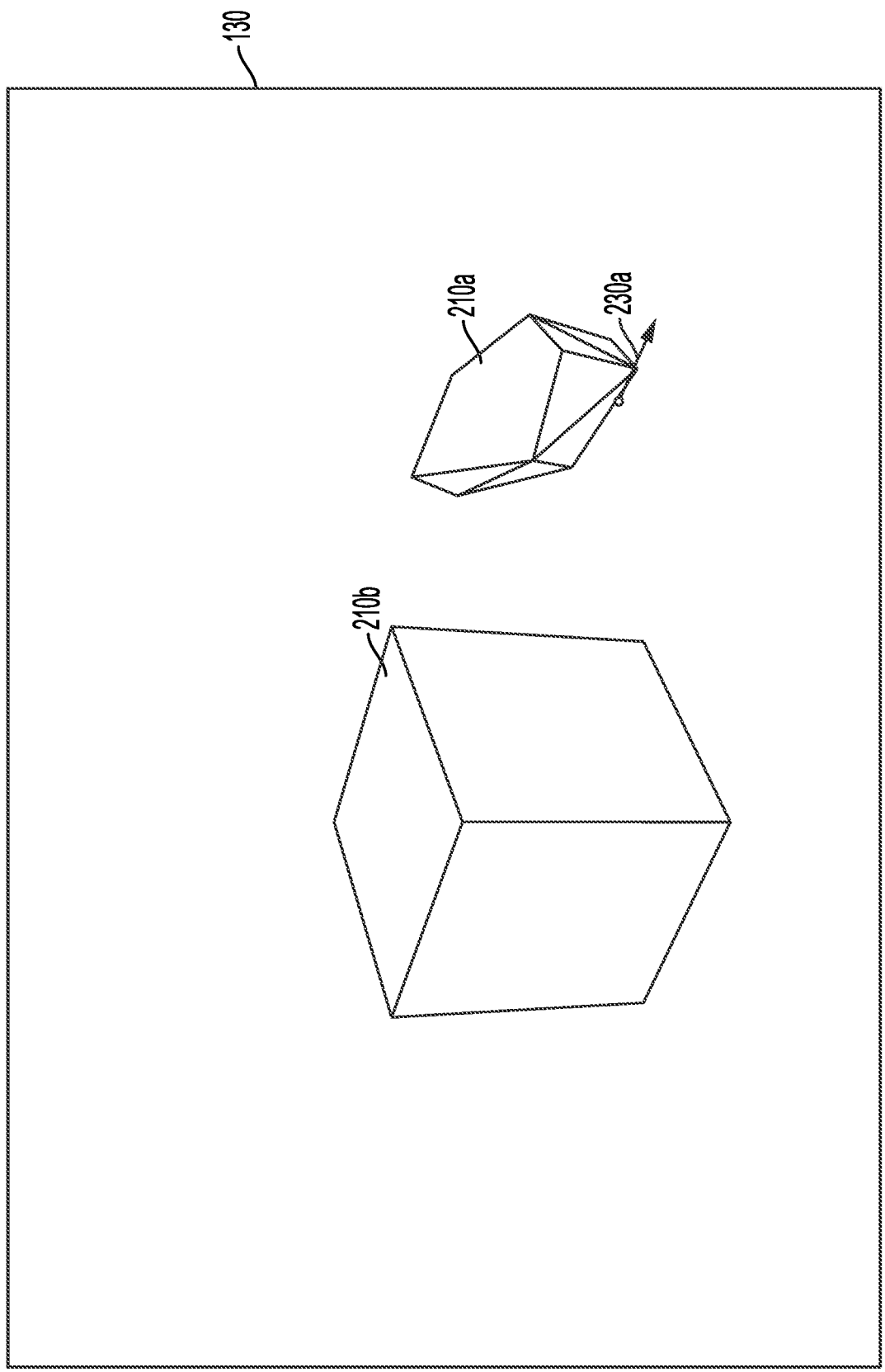
FIG. 5 shows another example of the GUI in which the first object and the second object are visible, according to some embodiments described herein.
Figure 6:
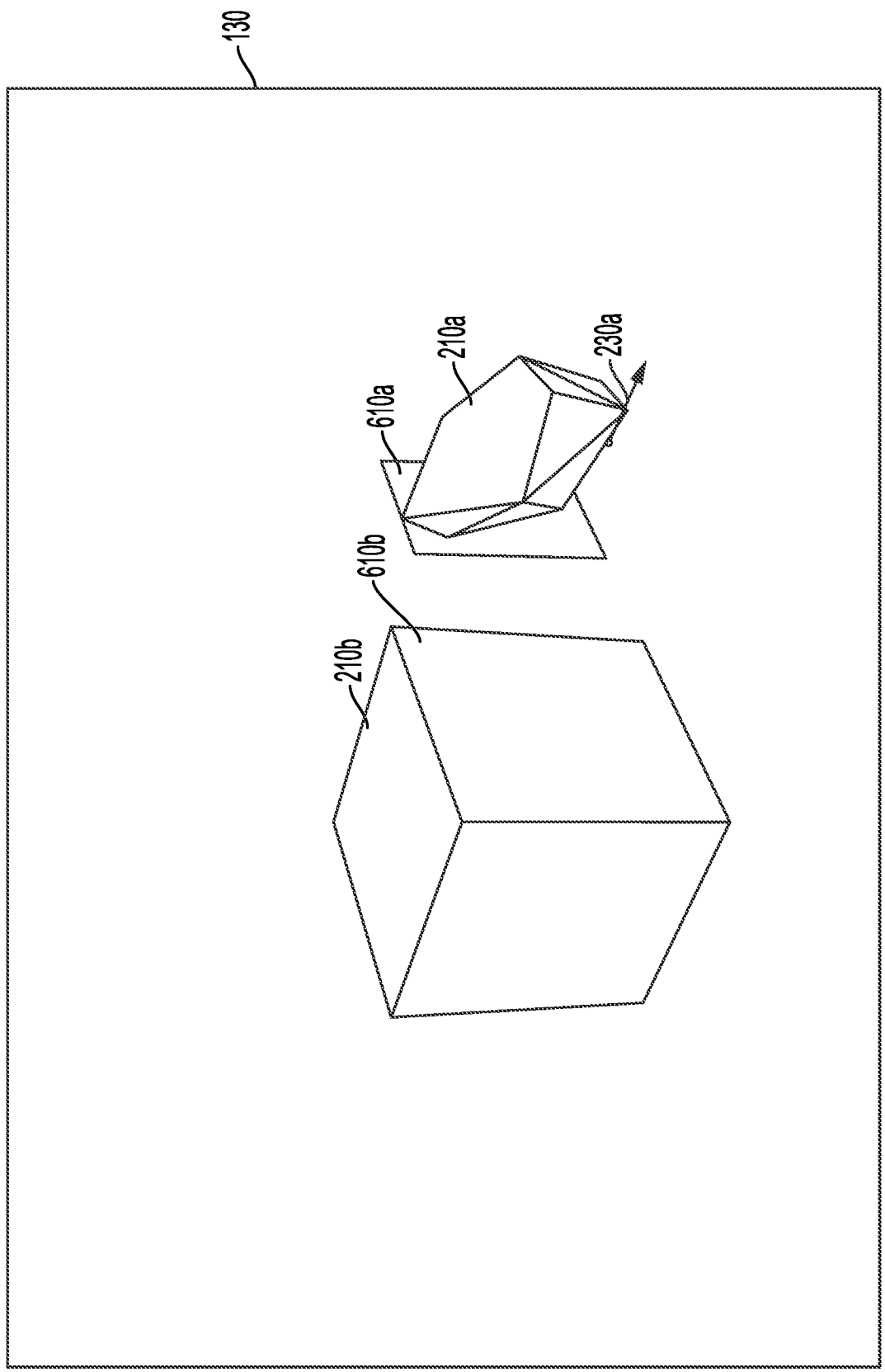
FIG. 6 shows an example of the GUI in which the first object and the second object of FIG. 5 are snapped into alignment in the first dimension based on their bounding boxes, according to some embodiments described herein.

FIG. 5 and FIG. 6 illustrate an example in which a first object 210a is moved in a first dimension corresponding to a first axis 230a in a local coordinate system and in the world coordinate system, where such coordinate systems are aligned. Specifically, FIG. 5 shows an example of the GUI 130 in which the first object 210a and the second object 210b are visible, unaligned, and not in contact with each other, according to some embodiments described herein. In this example, a user requests that the first object 210a be moved in the first dimension; for instance, the user may make this request by dragging the first axis 230a of a widget 220 for the first object 210a, where the first axis 230a corresponds to the first dimension. In the example of FIG. 5 and FIG. 6, the alignment system 100 determines that the first object 210a has been moved sufficiently close to alignment with the second object 210b in the first dimension.

Thus, as shown in FIG. 6, the alignment system 100 snaps the first object 210a into alignment with the second object 210b. The result is that a first face 610a of the bounding box of the first object 210a ends up in a common plane with a second face 610b of the bounding box of the second object 210b. However, in this example, as shown in FIG. 6, the first face 610a and the second face 610b do not come into direct contact with each other. Rather, those faces of the respective bounding boxes of the first object 210a and the second object 210b share a common value in the first dimension, due to the snap operation, but share no values in the other two dimensions and thus do not come into direct contact.

Figure 7:
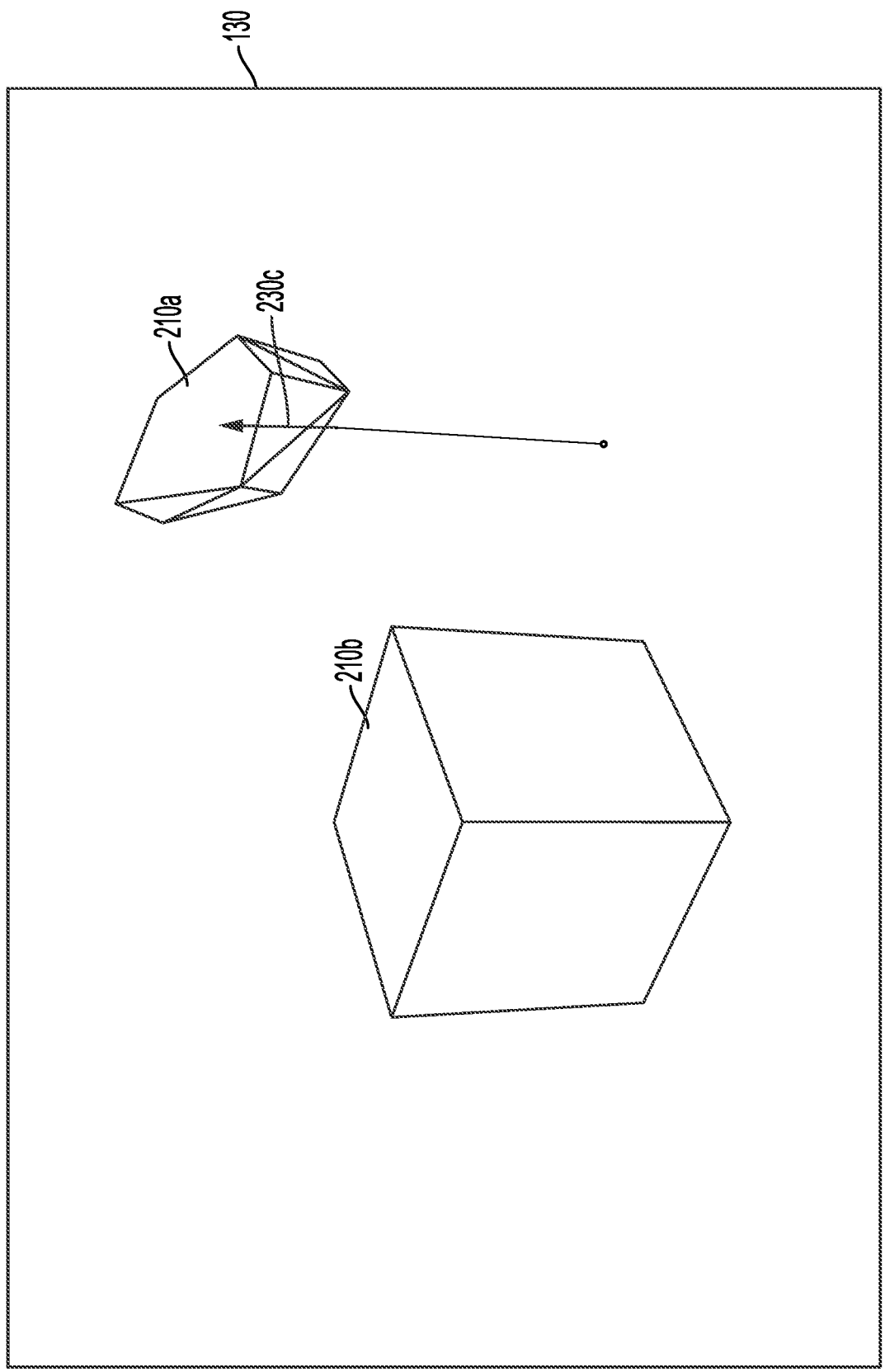
FIG. 7 shows yet another example of the GUI in which the first object and the second object are visible, according to some embodiments described herein.
Figure 8:
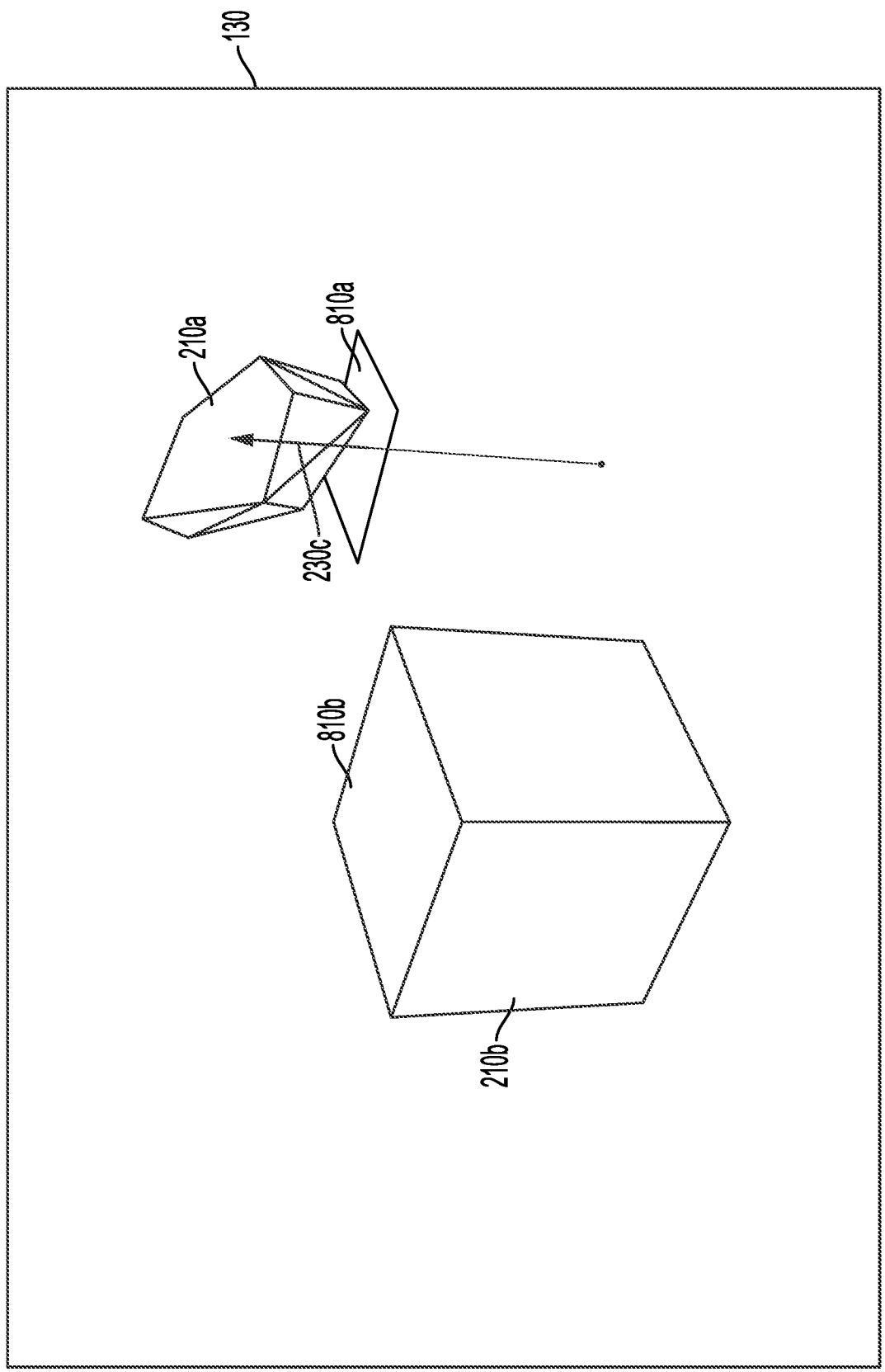
FIG. 8 shows an example of the GUI in which the first object and the second object of FIG. 7 are snapped into alignment, in a different dimension than that in which the objects are aligned in FIG. 3 and FIG. 6, based on their bounding boxes, according to some embodiments described herein.

FIG. 7 and FIG. 8 illustrate another example in which a first object 210a is moved in a third dimension corresponding to a third axis 230c in a local coordinate system and in the world coordinate system, where such coordinate systems are aligned. Specifically, FIG. 7 shows an example of the GUI 130 in which the first object 210a and the second object 210b are visible, unaligned, and not in contact with each other, according to some embodiments described herein. In this example, a user requests that the first object 210a be moved in the third dimension; for instance, the user may make this request by dragging the third axis 230c of a widget 220 for the first object 210a, where the third axis 230c corresponds to the third dimension. In the example of FIG. 7 and FIG. 8, the alignment system 100 determines that the first object 210a has been moved sufficiently close to alignment with the second object 210b in the third dimension.

Thus, as shown in FIG. 8, the alignment system 100 snaps the first object 210a into alignment with the second object 210b. The result is that a first face 810a of the bounding box of the first object 210a ends up in a common plane with a second face 810b of the bounding box of the second object 210b. However, in this example, as shown in FIG. 8, the first face 810a and the second face 810b do not come into direct contact with each other. Rather, those faces of the respective bounding boxes of the first object 210a and the second object 210b share a common value in the third dimension, due to the snap operation, but share no values in the other two dimensions and thus do not come into direct contact.

Figure 9:
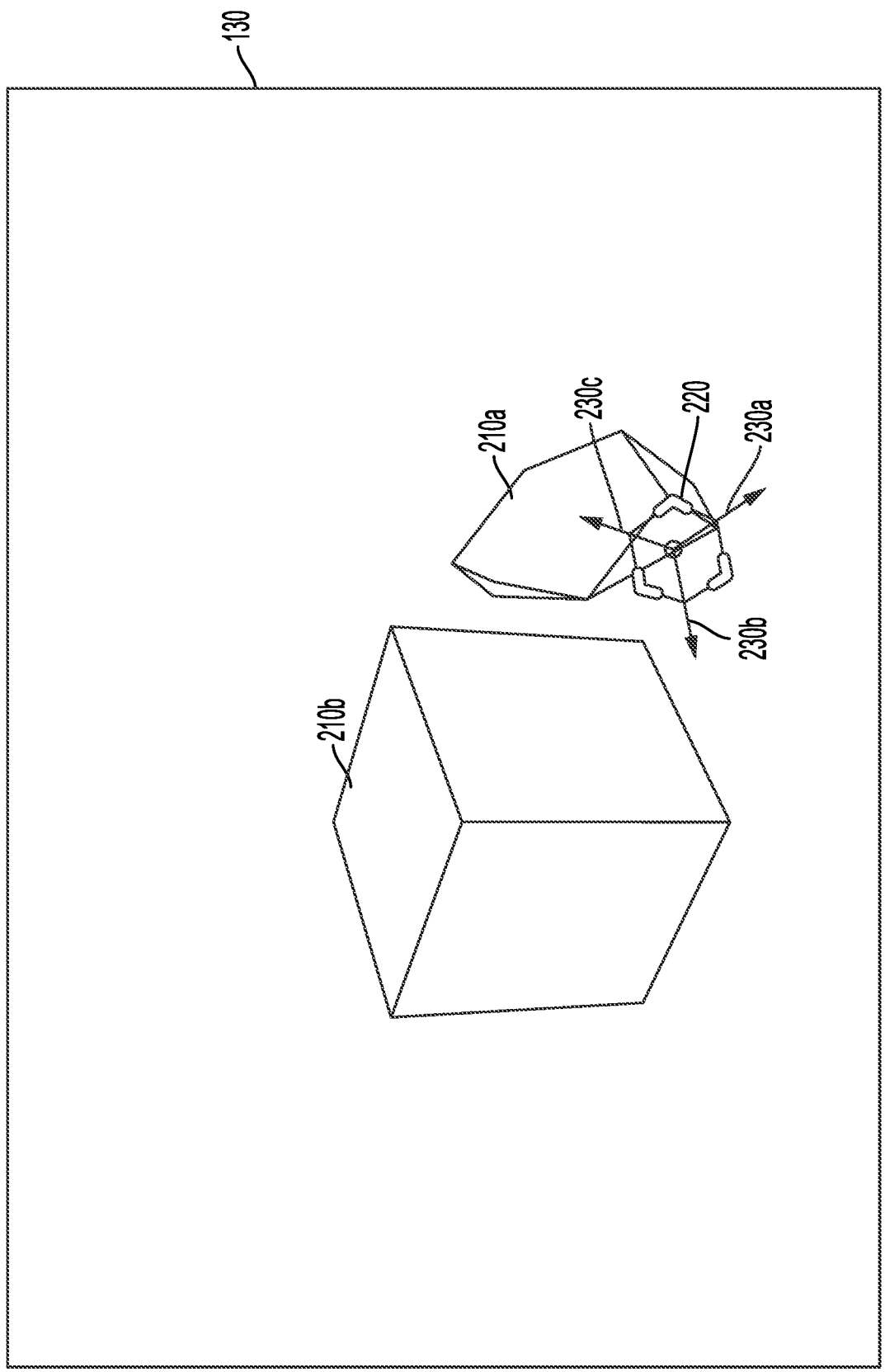
FIG. 9 shows an example of the GUI in which the first object and the second object are visible and in which a local coordinate space of the first object differs from a world coordinate system, according to some embodiments described herein.
Figure 10:
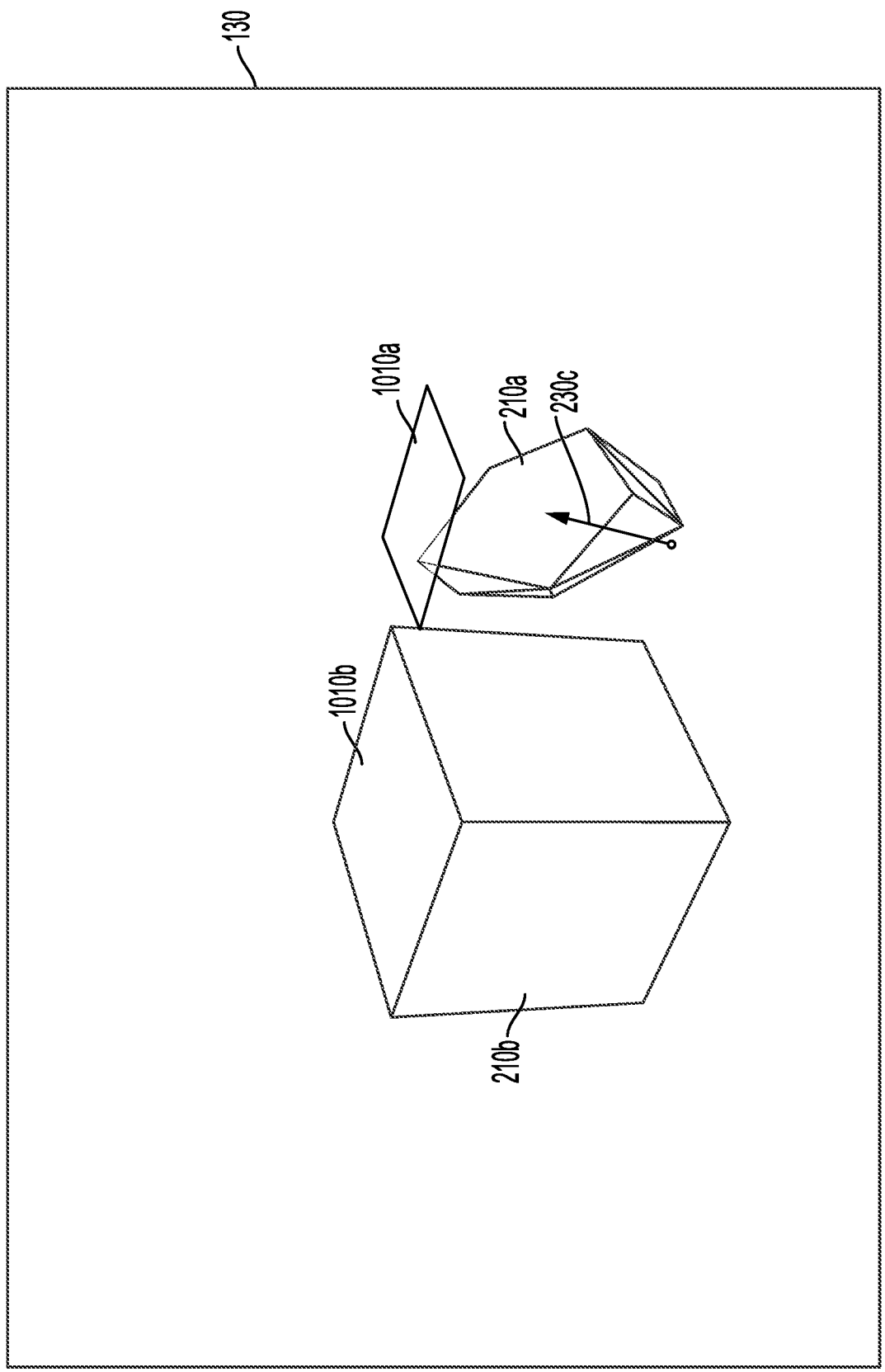
FIG. 10 shows an example of the GUI in which the first object and the second object of FIG. 9 are snapped into alignment based on their bounding boxes, according to some embodiments described herein.

FIG. 9 and FIG. 10 illustrate an example in which a first object 210a is moved in a third dimension corresponding to a third axis 230c in a local coordinate system, where the local coordinate system is not in alignment with the world coordinate system. In other words, the local coordinate system of the first object 210a is rotated with the respect to the world coordinate system, such that the third dimension in the local coordinate system differs from the third dimension in the world coordinate system. As such, the widget 220 associated with the first object 210, as shown in FIG. 9, is rotated from the world space coordinate system. Thus, if the user interacts with the first object 210a by dragging the third axis 230c of the widget 220, the alignment system 100 as a result causes the first object 210a to move in the third dimension of the local coordinate system, which is a different movement than a hypothetical movement along a third dimension of the world coordinate system. Indeed, a movement in the third dimension only of the local coordinate system of the first object 210a equates to a move in multiple dimensions of the world coordinate system. FIG. 9 and FIG. 10 thus illustrate that the alignment system 100 is operative to snap objects into alignment in the world space, regardless of whether such objects are moving in one or multiple dimensions according to the world coordinate system.

Specifically, FIG. 9 shows an example of the GUI 130 in which the first object 210a and the second object 210b are visible, unaligned, and not in contact with each other, according to some embodiments described herein. In this example, a user requests that the first object 210a be moved in the third dimension of the local coordinate system of the first object 210a; for instance, the user may make this request by dragging the third axis 230c of a widget 220 for the first object 210a, where the third axis 230c corresponds to the third dimension in the local coordinate system. In the example of FIG. 9 and FIG. 10, the alignment system 100 determines that the first object 210a has been moved sufficiently close to alignment with the second object 210b in a third dimension of the world coordinate system. Even though the first object 210a has moved in the third dimension of its local coordinate system, an embodiment of the alignment system 100 still seeks to align objects according to the world coordinate system; thus, sufficient closeness of alignment is still based on the dimensions of the world coordinate system.

In an instance in which the first object 210a was moved in a direction that does not align with any single dimension in the world coordinate system, as in this example, an embodiment of the alignment system 100 causes the first object 210a to continue movement along the vector chosen by the user (e.g., the third dimension of the local coordinate system) so as to have the first object 210a snap to alignment in the world coordinate system through movement in the user's chosen direction (e.g., in a single dimension of the local coordinate system). Continued movement in the vector chosen by the user causes an intuitive result, rather than causing the first object 210a to jump into motion in another direction that might be aligned with a dimension in the world coordinate system. In short, the direction of a snap need not be limited to a direction in single dimension of the world coordinate system but, rather, can be implicitly selected by the user through the user's interaction with the object being moved.

In some embodiments, the alignment system 100 is configured to snap a first object 210a into alignment with a second object 210b in a dimension other than the dimension in which the first object 210a is being moved. The example of FIG. 9 and FIG. 10 is an instance of this, given that the first object 210a is moved in the first dimension in the local coordinate space but snapped to align with its bounding box to a position in the first dimension of the world coordinate space, where the local coordinate system and the world coordinate system are not aligned. However, additionally or alternatively, depending on the location of the second position to which the user moves the first object 210a, the alignment system 100 may determine that the first object 210a is sufficiently close to alignment with the second object 210b or with some other object in some other dimension of the world coordinate system. In short, snapping need not be limited to the direction in which a user moves an object.

Thus, as shown in FIG. 10, the alignment system 100 snaps the first object 210a into alignment with the second object 210b in the third dimension of the world coordinate system. The result is that a first face 1010a of the bounding box of the first object 210a ends up in a common plane with a second face 1010b of the bounding box of the second object 210b. In this example, as shown in FIG. 6, the first face 1010a and the second face 1010b do not come into direct contact with each other. Rather, those faces of the respective bounding boxes of the first object 210a and the second object 210b share a common value in the third dimension, due to the snap operation, but share no values in the other two dimensions and thus do not come into direct contact.

As mentioned above, an embodiment of the alignment system 100 utilizes a ray to determine whether to snap an object into alignment with another object. More specifically, an embodiment of the alignment system 100 uses one ray per dimension of the world coordinate system. With the rays, the alignment system 100 determines whether a snap operation should be performed on a first object 210a and, further, with which other object the first object 210a should be snapped into alignment.

Figure 11:
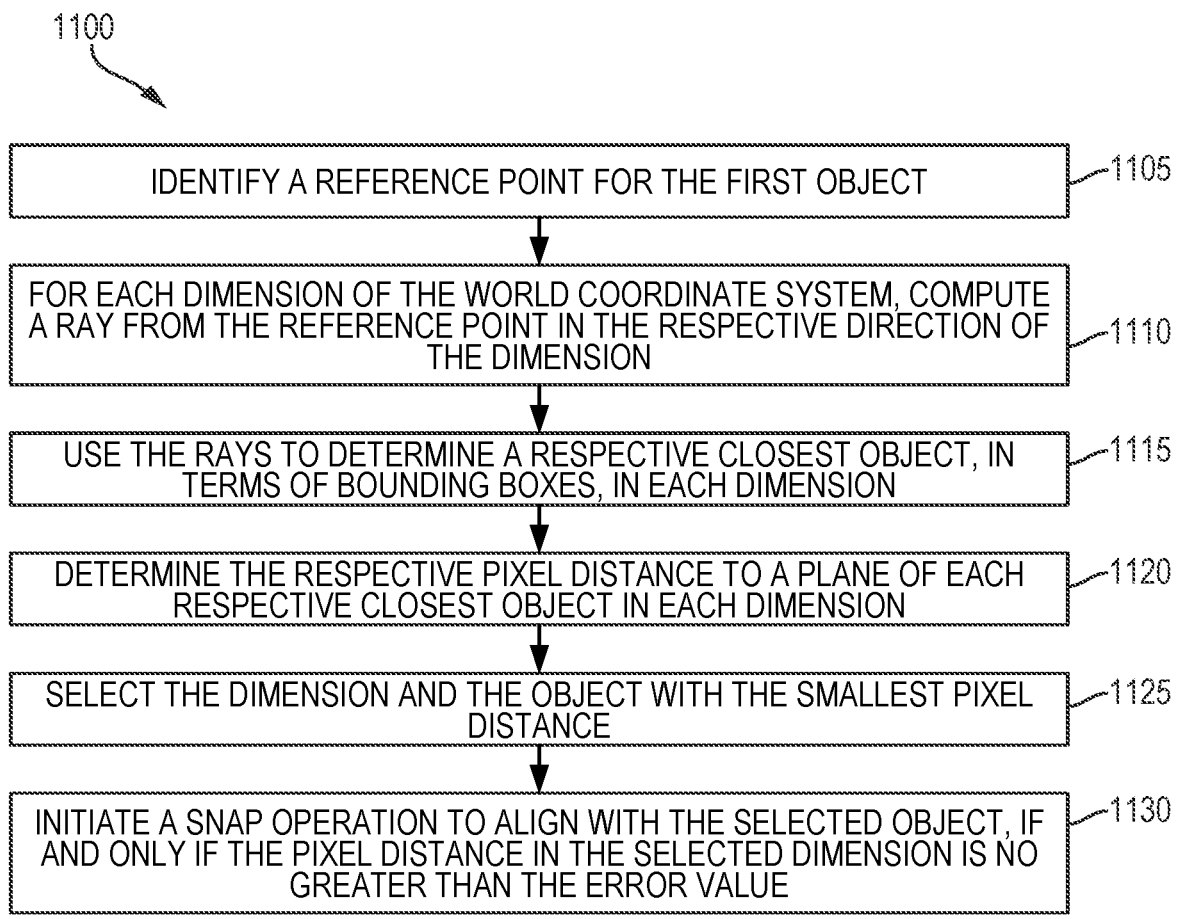
FIG. 11 is a diagram of an example of a process of determining whether and in which dimension to snap an object into alignment with another object based on bounding boxes, according to some embodiments described herein.

FIG. 11 is a diagram of an example of a process 1100 of determining whether and in which dimension to snap an object into alignment with another object based on bounding boxes, according to some embodiments described herein. Specifically, the process 1100 of FIG. 11 can be used to implement decision block 425 of the process 400 of FIG. 4 above. An embodiment of this process 1100 receives as input a first object 210a with which a user is interacting, as well as a second position, which is the position to which the user has moved the first object 210a so far. Further, when executing this process 1100 or a similar process, the alignment system 100 has access to other objects such that the alignment system 100 is capable of determining whether the first object 210a is sufficiently close to being aligned to any of such other objects.

The process 1100 depicted in FIG. 11, as well as other processes described herein, may be implemented in software executed by one or more processing units, in hardware, or in a combination software and hardware. This process 1100 is intended to be illustrative and non-limiting. Although FIG. 11 depicts various activities occurring in a particular sequence or order, this is not intended to be limiting. In certain embodiments, for instance, the activities may be performed in a different order, or one or more activities of the process 1100 may be performed in parallel.

As shown in FIG. 11, at block 1105, the process 1100 involves identifying a reference point for the first object 210a. In some embodiments, the reference point is used as a reference when determining whether to snap. For example, the reference point is the origin of the local coordinate system of the first object 210a, or the reference point is the projection of a screen interaction point (i.e., the location on the screen where the user clicks with a mouse or otherwise selects the first object 210a) onto a ground (e.g., a plane defined by y=0) of the world space.

At block 1110 of the process 1100, for each dimension of the world coordinate system, an embodiment of the alignment system 100 computes a ray extending from the reference point determined at block 1105 in the direction of the axis corresponding to that dimension. Thus, the alignment system 100 computes three such rays, one corresponding to each dimension in the world coordinate system.

Figure 12:
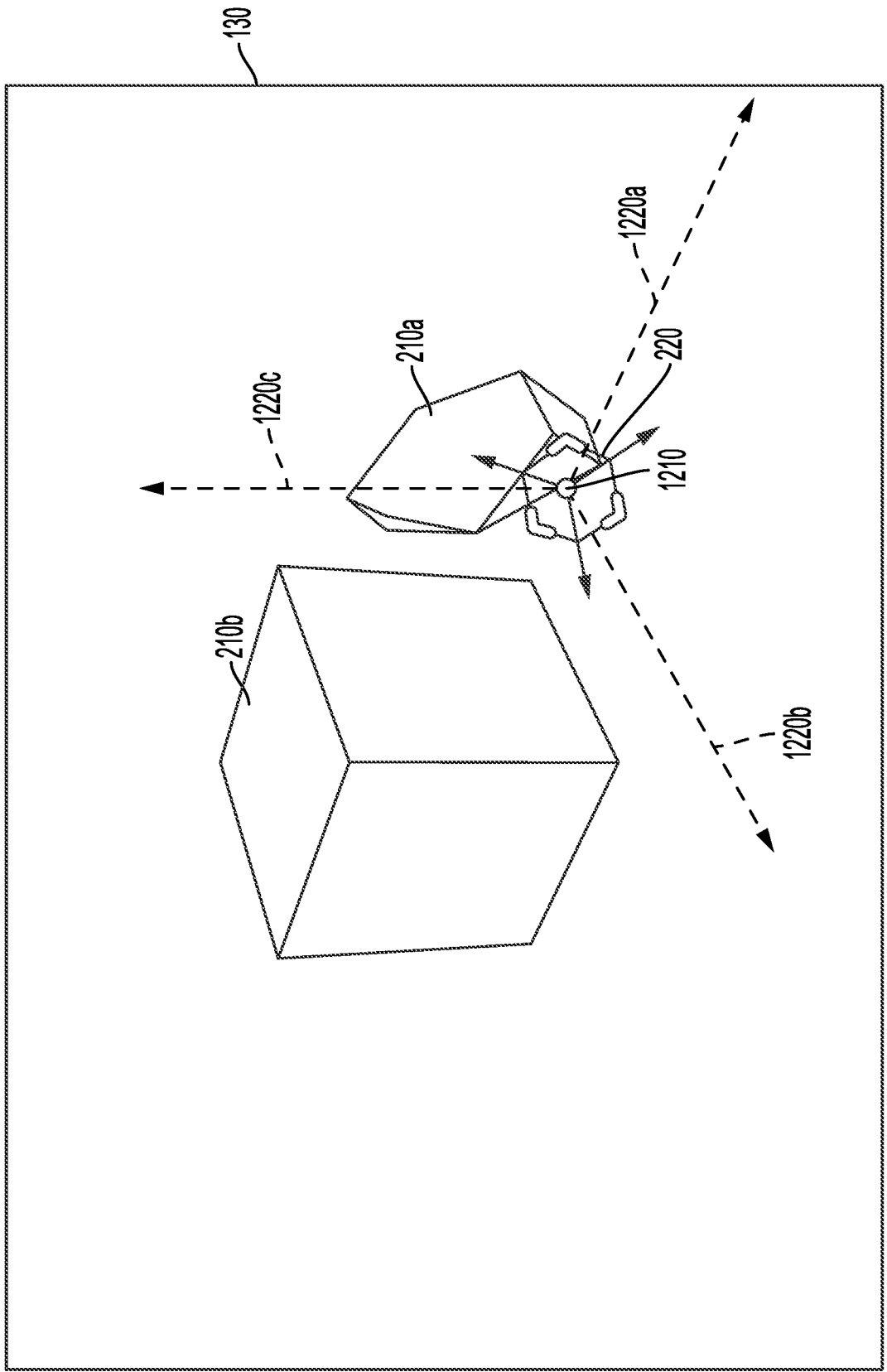
FIG. 12 shows an example of rays computed for each of three dimension as part of a process for determining whether and to which other object to snap an object, according to some embodiments described herein.

As an illustration, FIG. 12 shows an example of the three rays computed for a first object 210a, according to some embodiments. In the example of FIG. 12, the local coordinate system of the first object 210a is unaligned with the world coordinate system. However, because snapping is performed with respect to the world coordinate system in some embodiments, the alignment system 100 computes a ray for each dimension of the world coordinate system as shown in FIG. 12. In this example, the reference point 1210 used is the origin of the first object 210a, which is shown as part of the widget 220. Further, the three rays are indicated as 1220a, 1220b, and 1220c in the respective first, second, and third dimensions of the world coordinate system.

Returning to FIG. 11, at block 1115, the process 1100 involves utilizing the rays computed at block 1110 to determine a closest object to the first object 210a in the various dimensions. For instance, given one of such rays, an embodiment of the alignment system 100 determines a first intersection and a second intersection. The first intersection is located at the point where the ray intersects the first bounding box of the first object 210a. The second intersection is at located at the closest point where the ray intersects a plane in which any face of a bounding box of another object that is visible in the world space given the current camera perspective. In other words, the second intersection identifies the closest other bounding in terms of the dimension corresponding to the ray. The alignment system 100 computes a respective first intersection and a respective second intersection for each ray or, in other words, for each dimension.

At block 1120, in some embodiments, the alignment system 100 determines the pixel distance to each closest object (i.e., one in each dimension) determined at block 1115. In some embodiments, the alignment system 100 computes this pixel distance, given the respective first intersection and the respective second intersection, by projecting the segment between the first intersection and the second intersection onto screen space. The alignment system 100 then determines the length of that segment in screen space, and that length is the desired pixel distance between the bounding box of the first object 210a and the bounding box of the closest other object in the respective dimension.

At block 1125, the alignment system 100 selects the dimension for which the lowest pixel distance was computed at block 1120. In other words, an embodiment of the alignment system 100 compares the three pixel distance computed at block 1120 and selects the dimension corresponding to the ray that yielded the lowest pixel distance (i.e., the closest other object in terms of a respective dimension). Further, the alignment system 100 selects the object deemed closest in that dimension. In the remainder of this process 1100, the alignment system 100 will determine whether to snap the first object 210a into alignment with this selected object.

At block 1130, in some embodiments, the process 1100 involves initiating the snap operation to align the first object with the selected object in the selected dimension if the pixel distance is no greater than the error value. However, if the pixel distance is greater than the error value, then an embodiment of the alignment system 100 decides not to snap the first object 210a into alignment with the selected object. In this manner, performing block 1130 causes the alignment system 100 to proceed to block 430 or 435 in the process 400 described above.

If the alignment system 100 does indeed snap the first object 210a into alignment with the second object, and if the user interaction (i.e., moving or holding the first object 210a) that initiated the snap operation is still ongoing, then an embodiment of the snap system 100 considers performing one or two additional snaps in the one or two remaining dimensions, in addition to the snap that has already been performed. In some embodiments, in that case, the alignment system 100 selects a second dimension from among the two dimensions in which the first object 210a has not yet been snapped. Specifically, given the new position to which the first object 210a was just snapped, the alignment system 100 computes a respective ray for each of the remaining two dimensions as in block 1120. The alignment system 100 then selects the dimension with the lower pixel distance. The alignment system 100 decides whether to perform a snap operation in that newly selected dimension to the closest object in that dimension, again based on a comparison of the respective pixel distance to the error value. If that snap, too, is performed, then the alignment system 100 considers performing a third snap in the last available dimension given the updated position of the first object 210a. Thus, the alignment system 100 may perform one, two, or three snaps (i.e., up to one in each dimension), and such snaps are ordered based on the proximity of other objects in the respective dimensions. In some embodiments, the result can differ based on ordering when multiple snap operations are applied across three dimensions; thus, some embodiments consistently use proximity to order snap operations performed on an object during a single user interaction.

In cases where multiple snaps are performed, some embodiments of the alignment system 100 determine a respective direction of snaps subsequent to the first based in part on the one or more snaps that have already been performed during the present user interaction. In one example, the alignment system 100 performs a first snap that moves the first object 210a (i.e., the object being moved by a user) into alignment with a second object 210b in a first dimension. To this end, the alignment system 100 identifies a first dimension for snapping, where the first dimension may be the dimension in the world coordinate system in which the first object 210a is closest to alignment with the second object 210b. The alignment system 100 determines an intersection line that is the intersection between the movement plane of the first object 210a and a snap plane, or alignment plane, with which the second object 210b is aligned (i.e., with which the bounding box of the second object 210b is aligned in the first dimension) in the first dimension. The alignment system 100 determines a delta vector, which is the vector from the reference point of the first object 210a in the direction of the closest point on the intersection line. To align the first object 210a with the second object 210b, the alignment system 100 moves the first object 210a along the delta vector, and thus within the movement plane, to position the reference point on the intersection line.

In some embodiments, for each subsequent snap, the alignment system 100 does not necessarily move the first object 210a along the respective delta vector for that snap operation. For instance, the alignment system 100 determines a second intersection line as the intersection between the movement plane, which is the same as the movement plane for the first snap, and a second alignment plane. In this case, the second alignment plane is the closest plane at which the first object 210a would be aligned with the second object 210b in a second dimension. The second dimension is the dimension in which the first object 210a is closest to being aligned with the second object 210b, other than any dimensions in which the first object 210a is already aligned with the second object 210b. The alignment system 100 determines a second delta vector, which is the vector from the reference point to the closest point on the second intersection line. However, in some cases, moving the first object 210a along this second delta vector could cause the first object to come out of alignment with the second object 210b in the first dimension, and that would be undesirable. Thus, some embodiments compute the cross product between the delta vector and the second delta vector, resulting in a constraint vector. The alignment system 100 then moves the first object 210a along the constraint vector to bring the first object 210a into alignment with the second object 210b in the second dimension. Through the use of this constraint vector, the first object 210a remains in alignment with the second object 210b in the first dimension while moving into alignment with the second object 210b in the second dimension.

Analogously, to perform a third snap, an embodiment of the alignment system 100 moves the first object 210a along another constraint vector computed as the cross product of a third delta vector with the cross product of the delta vector and the second delta vector, and the alignment system 100 moves the first object 210a along this resulting other constraint vector to align the first object 210a with the second object 210b in the third dimension. However, as described above in detail, some embodiments of the alignment system 100 only perform each such subsequent snap if the pixel distance to achieve such snap is within an error value.

As mentioned above, embodiments of the alignment system 100 are not limited to snapping objects into alignment based on bounding boxes (i.e., snapping to make bounding boxes align). Rather, certain embodiments are configured to snap based on center points of objects; for instance, the alignment system 100 causes an object to snap into alignment with another object such that a center point of the object reaches a common value with a center point of the other object in a dimension according to the world coordinate system. In other words, snapping based on center points aligns center points in a plane perpendicular to an axis defining the world coordinate system. The center point of an object can be defined in various ways; for example, the center point is a centroid or center of mass of the respective object, or the center point is the geometric center of the minimum bounding box for the respective object. Snapping based on center points is demonstrated in an example shown in FIG. 13 and FIG. 14.

Figure 13:
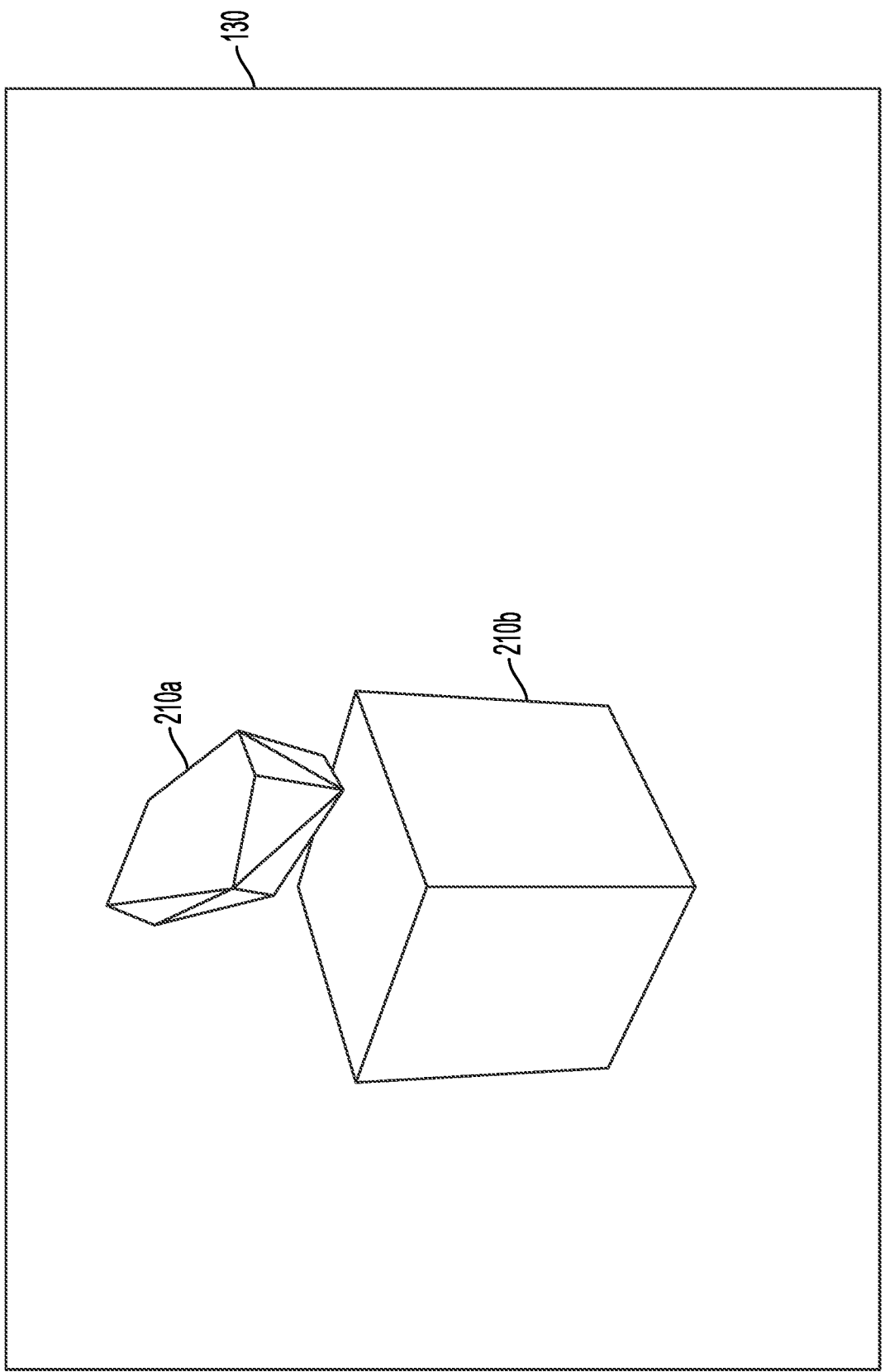
FIG. 13 shows yet another example of the GUI in which the first object and the second object are visible, according to some embodiments described herein.
Figure 14:
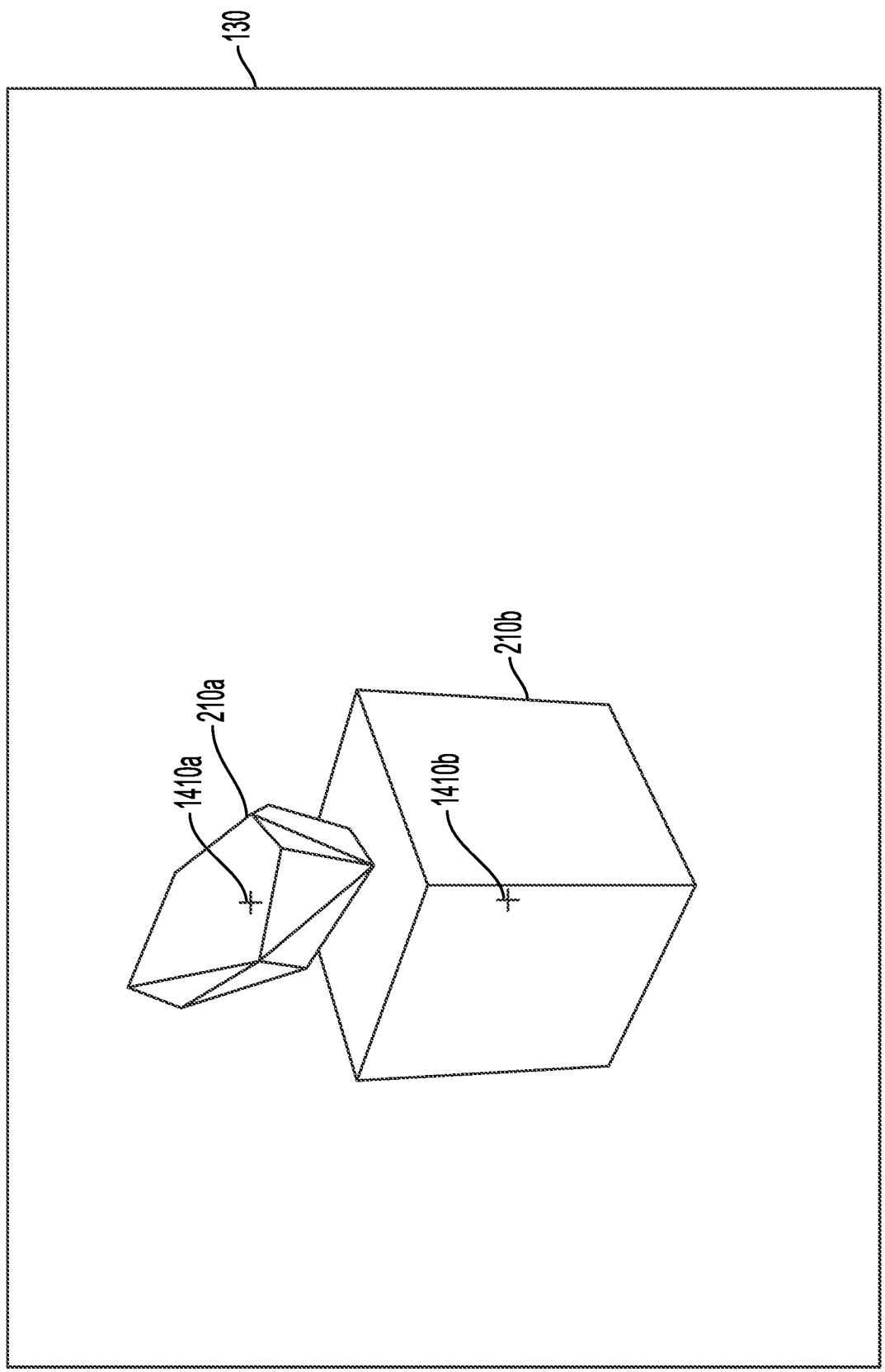
FIG. 14 shows an example of the GUI in which the first object and the second object of FIG. 13 are snapped into alignment based on their center points, according to some embodiments described herein.

FIG. 13 and FIG. 14 illustrate an example in which a first object 210a is moved in a second dimension corresponding to a second axis 230b in a local coordinate system and in the world coordinate system, where such coordinate systems are aligned. Specifically, FIG. 13 shows an example of the GUI 130 in which the first object 210a and the second object 210b are visible, unaligned, and not in contact with each other, according to some embodiments described herein. In this example, a user requests that the first object 210a be moved in the second dimension; for instance, the user may make this request by dragging the second axis 230b of a widget 220 for the first object 210a, where the second axis 230b corresponds to the second dimension. In the example of FIG. 13 and FIG. 14, the alignment system 100 determines that the first object 210a has been moved sufficiently close to alignment with the second object 210b in the second dimension. Specifically, the alignment system 100 determines that a center point of the first object 210a has been moved to a value in the second dimension that is sufficiently close the value of a center point of the second object 210b in the second dimension.

Thus, as shown in FIG. 14, the alignment system 100 snaps the first object 210a into alignment with the second object 210b. The result is that a first center point 1410a of the first object 210a ends up at a common value in some dimension of the world coordinate system as a second center point 1410b of the second object 210b. In other words, the alignment system 100 may snap the first object 210a to a position such that the first center point 1410a falls into a common plane with the second center point 1410b, where that plane is perpendicular to some dimension in the world coordinate system.

Figure 15:
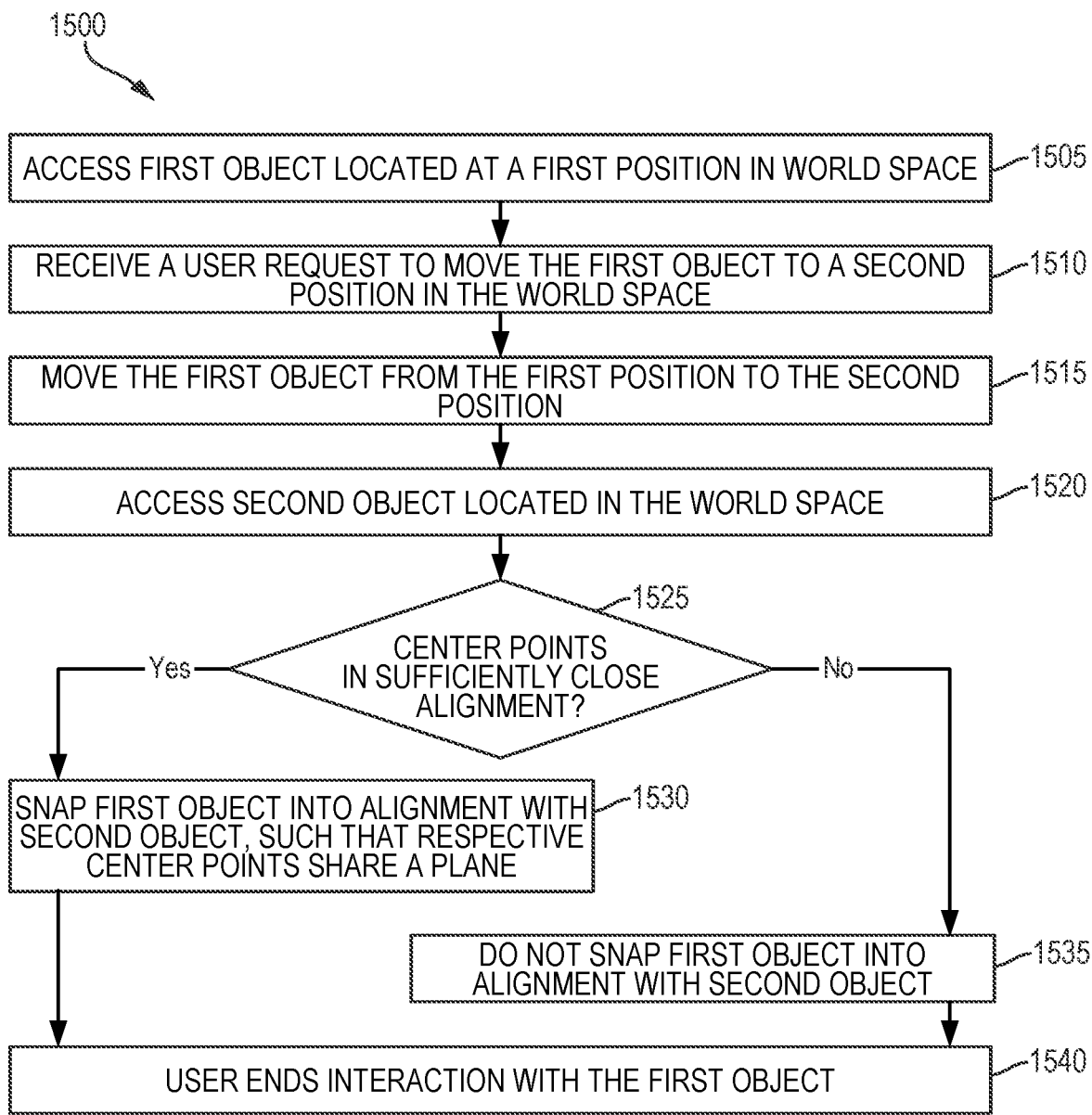
FIG. 15 is a diagram of an example of a process of snapping objects into alignment based on their center points, according to some embodiments described herein.

FIG. 15 is a diagram of an example of a process 1500 of snapping objects into alignment based on their center points, according to some embodiments described herein. More specifically, this process 1500 is used by an embodiment of the alignment system 100 to snap an object with which a user is interacting into alignment with another object. The process 1500 depicted in FIG. 15, as well as other processes described herein, may be implemented in software executed by one or more processing units, in hardware, or in a combination software and hardware. This process 1500 is intended to be illustrative and non-limiting. Although FIG. 15 depicts various activities occurring in a particular sequence or order, this is not intended to be limiting. In certain embodiments, for instance, the activities may be performed in a different order, or one or more activities of the process 1500 may be performed in parallel.

As shown in FIG. 15, at block 1505 of the process 1500, an embodiment of the alignment system 100 accesses a first object 210a located at a first position in a world space. In some embodiments, the alignment system 100 accesses a definition of the first object 210a as stored in an object repository 140. The definition indicates a shape of the first object 210a and a position of the first object 210a in the world space. The first object 210a has a first center point 1410a. The alignment system 100 computes the first center point 1410a, or alternatively, the alignment system 100 accesses the coordinates of the first center point 1410a in the world coordinate system, which, for instance, is stored in the object repository 140.

At block 1510 of the process 1500, the alignment system 100 may receive a request to move the first object 210a from a first position (e.g., the current position of the first object 210a) to a second position. For instance, this request is made by the user through the user's interaction with a widget 220 associated with the first object 210 or through some other interaction with the GUI 130 or input devices of the computing system 105. Further, in some embodiments, the interaction is ongoing while the operations of block 1515, block 1520, decision block 1525, block 1530, and block 1535 are performed.

At block 1515 of the process 1500, responsive to the request, an embodiment of the object-movement subsystem 150 of the alignment system 100 causes the first object 210a to move from the first position to the second position. For example, in some embodiments, the alignment system 100 updates the definition of the first object 210a (e.g., in the object repository 140) to indicate that the first object 210a is located at the second position in the world space, and as a result, the renderer 145 then renders the first object 210a at the second position.

At block 1520 of the process 1500, an embodiment of the alignment system 100 accesses a second object 210b located at a respective position in the world space. In some embodiments, accessing the second object 210b occurs in the same manner or a similar manner in which the alignment system 100 accessed the first object 210a. For instance, the alignment system 100 retrieves a definition of the second object 210b from the object repository, where that definition includes a shape and location of the second object 210b. Like the first object 210a, the second object 210b has a respective center point, referred to as the second center point 1410b. The alignment system 100 computes the second center point 1410b based on the definition of the second object 210b, or the alignment system 100 accesses the coordinates of the second center point 1410b as precomputed or as computed by some other component.

Blocks 1525-1540, in some embodiments, implement a step for snapping the first object into alignment with the second object based a distance in a given dimension, along a ray extending from the first object as moved, between the first bounding box and the second bounding box. As described below, an embodiment the alignment system 100 will determine whether the first object 210a, as moved, is sufficiently close to alignment with the second object 210b. Although this example of a process 1500 determines whether the first object 210a, as moved, is sufficiently aligned only with the second object 210b, an embodiment of the alignment system 100 makes such determination with respect to multiple objects rather than with respect to only a single object (i.e., the second object 210b). In other words, the alignment system 100 accesses multiple objects at block 1520 of the process 1500, and the alignment system 100 considers whether the first object 210a, as moved, is sufficiently close to any or all of such multiple objects as described below with respect to the second object 210b. Determination of which object to snap to in that case will be described in detail later in this disclosure.

At decision block 1525, the process 1500 involves detecting whether the first object 210a, as moved, is sufficiently close to alignment with the second object 210b. For instance, this detection is performed by the proximity-detection subsystem 160 of the alignment system 100. In some embodiments, to this end, the alignment system 100 may compute a respective ray corresponding to each dimension of the world space as described below in more detail. For a given dimension, the respective ray originates at a first center point 1410a associated with the first object 210a and is directed parallel to the axis in world space corresponding to that dimension. At least one of such rays intersects a perpendicular plane (i.e., perpendicular to the respective ray and to the respective dimension corresponding to the ray) in which the second center point 1410b lies. For such a ray, the alignment system 100 computes an intersection, which is the closest intersection to the first center point 1410a between the ray and a perpendicular plane in which the second center point 1410b lies. The alignment system 100 computes a pixel length of the segment between the first center point 1410a and the intersection or, in other words, a pixel distance between the first center point 1410b and the plane of the second center point 1410b along the ray. Because the ray, and thus this segment, is in 3D space, the alignment system 100 projects the segment onto screen space to compute this pixel distance. If multiple such rays intersect respective perpendicular planes of the second center point 1410b, the remaining blocks of this process 1500 apply to the ray resulting in the smallest such pixel distance.

In some embodiments, the alignment system 100 utilizes an error value, or threshold, to determine whether the first object 210a has been moved into a position that is sufficiently close to alignment with the second object 210b. Specifically, for instance, if the pixel distance described above is no more than the error value, then an embodiment of the alignment system 100 deems the first object 210a, as moved, to be sufficiently close to alignment with the second object 210b. In this example, alignment is defined as the first center point 1410a lying in a plane with the second center point 1410b, where that plane is perpendicular to an axis in the world coordinate system such that the first center point 1410a and the second center point 1410b share a value in some dimension.

If the first object 210a, as moved to the second position, is deemed sufficiently close to alignment with the second object 210b (e.g., if the pixel distance is no greater than an error value), then the process 1500 proceeds to block 1530. Otherwise, if the first object 210a is deemed to not be sufficiently close to such alignment, then the process 1500 skips ahead to block 1535.

At block 1530, the first object 210a has been deemed sufficiently close to alignment with the second object 210b. As such, the process 1500 involves snapping the first object 210a into alignment with the second object 210b by moving the first object 210a an additional amount toward the second object 210b. In some embodiments, for instance, the snapping subsystem 170 of the alignment system 100 causes the first object 210a to move along the ray computed at decision block 1525 for a distance corresponding to the pixel distance computed at decision block 1525. In other words, the first object 210a is moved along the ray into alignment, based on center points, with the second object 210b.

At block 1535, the first object 210a has been deemed not sufficiently close to alignment with the second object 210b. As such, the process 1500 involves not snapping the first object 210a into alignment with the second object 210b. In other words, an embodiment of the alignment system 100 allows the first object 210a to remain at the second position to which the user requested that the first object 210a be moved.

At block 1540, regardless of the whether the snap operation was performed, the user ends the interaction with the first object 210a at some point. In some embodiments, the first object 210a is thus aligned with the second object 210b if the snap operation occurred (e.g., if block 1530 was executed) or not (e.g., if block 1535 was executed).

As mentioned above, an embodiment of the alignment system 100 utilizes a ray to determine whether to snap an object into alignment with another object based on center points. More specifically, an embodiment of the alignment system 100 uses one ray per dimension of the world coordinate system. With the rays, the alignment system 100 determines whether a snap operation should be performed on a first object 210*a* and, further, with which other object the first object 210*a* should be snapped into alignment.

Figure 16:
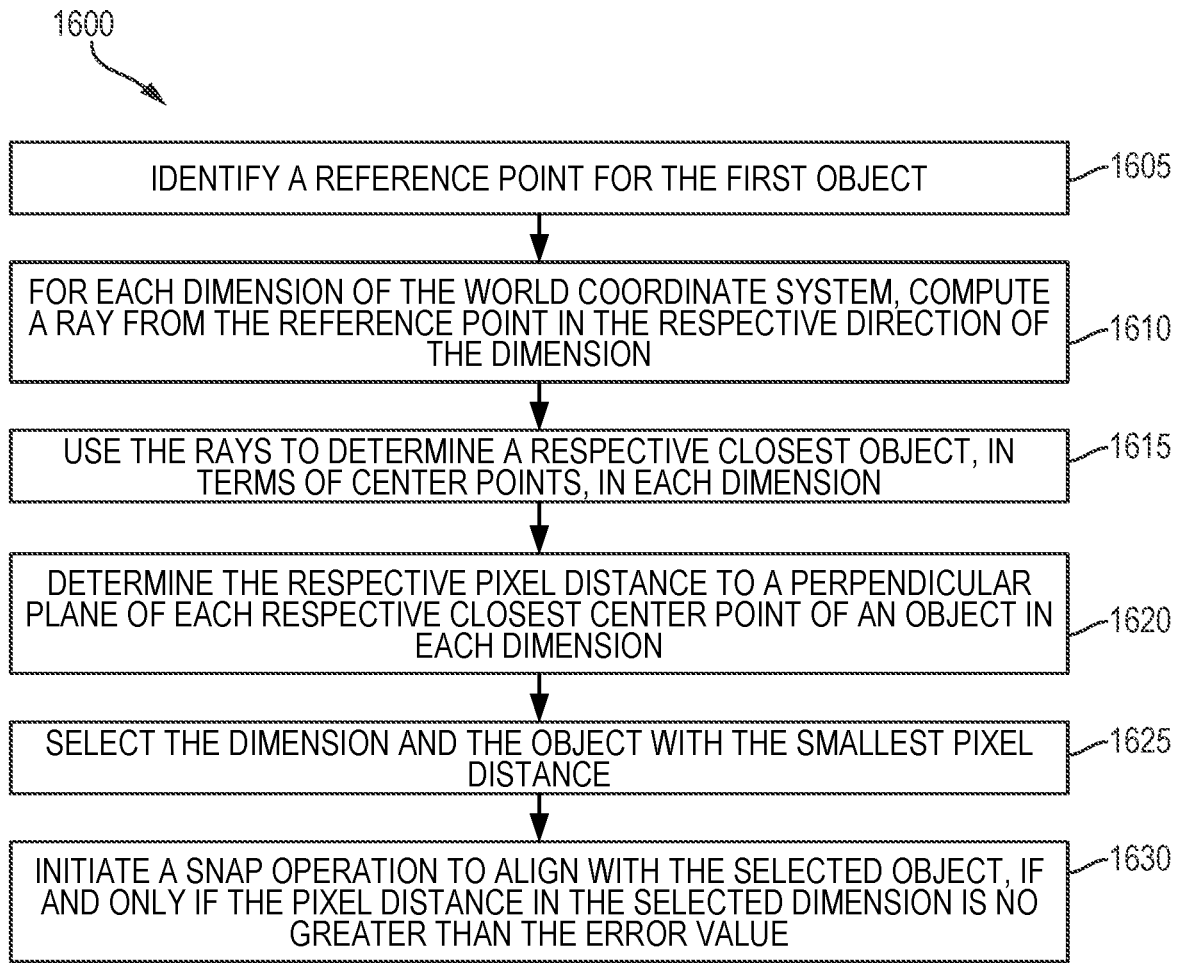
FIG. 16 is a diagram of an example of a process of determining whether and in which dimension to snap an object based on center points, according to some embodiments described herein.

FIG. 16 is a diagram of an example of a process 1600 of determining whether and in which dimension to snap an object into alignment with another object based on center points, according to some embodiments described herein. Specifically, the process 1600 of FIG. 16 can be used to implement decision block 1525 of the process 1500 of FIG. 15 above. An embodiment of this process 1600 receives as input a first object 210*a* with which a user is interacting, as well as a second position, which is the position to which the user has moved the first object 210*a* so far. Further, when executing this process 1600 or a similar process, the alignment system 100 may have access to other objects such that the alignment system 100 is capable of determining whether the first object 210*a* is sufficiently close to being aligned to any of such other objects.

The process 1600 depicted in FIG. 16, as well as other processes described herein, may be implemented in software executed by one or more processing units, in hardware, or in a combination software and hardware. This process 1600 is intended to be illustrative and non-limiting. Although FIG. 16 depicts various activities occurring in a particular sequence or order, this is not intended to be limiting. In certain embodiments, for instance, the activities may be performed in a different order, or one or more activities of the process 1600 may be performed in parallel.

As shown in FIG. 16, at block 1605, the process 1600 involves identifying a reference point of the first object 210*a*. In some embodiments, the reference point is used as a reference when determining whether to snap. For example, when snapping based on center points, as in this example of a process 1600, the reference point is the center point of the first object 210*a*.

At block 1610 of the process 1600, for each dimension of the world coordinate system, an embodiment of the alignment system 100 computes a ray extending from the reference point determined at block 1605 in the direction of the axis corresponding to that dimension. Thus, the alignment system 100 computes three such rays, one corresponding to each dimension in the world coordinate system.

At block 1615, the process 1600 involves utilizing the rays computed at block 1610 to determine a closest object to the first object 210*a* in the various dimensions. For instance, given one of such rays, an embodiment of the alignment system 100 determines an intersection, which is located at the point where the ray intersects a perpendicular plane (i.e., perpendicular to the respective ray) in which falls the closest center point from among the various center points of other objects visible in the world space. The alignment system 100 computes the respective intersection for each ray, and thus for each dimension, to determine the closest other object based on center points in each dimension.

At block 1620, an embodiment of the alignment system 100 determines the pixel distance to each intersection (i.e., to each closest center point across the three dimensions) determined at block 1615. In some embodiments, for each ray and each corresponding dimension, the alignment system 100 computes this pixel distance by projecting the segment between the reference point and the respective intersection onto screen space. The alignment system 100 then determines the length of that segment in screen space, and that length is the desired pixel distance between the center point (i.e., the reference point) of the first object 210*a* and the closest center point of other objects in the respective dimension.

At block 1625, the alignment system 100 selects the dimension for which the lowest pixel distance was computed at block 1620. In other words, an embodiment of the alignment system 100 compares the three pixel distances computed at block 1620 and selects the dimension corresponding to the ray that yielded the lowest pixel distance (i.e., the closest center point). Further, the alignment system 100 selects the object having that closest center point. In the remainder of this process 1600, the alignment system will determine whether to snap the first object 210*a* into alignment with this selected object.

At block 1630, in some embodiments, the process 1600 involves initiating the snap operation to align the first object 210*a* with the second object 210*b* and, more specifically, to align the center point of the first object 210*a* with the center point of the selected object in the selected dimension. However, if the pixel distance is greater than the error value, then an embodiment of the alignment system 100 decides not to snap the first object 210*a* into alignment with the selected object. In this manner, performing block 1630 causes the alignment system 100 to proceed to block 1530 or 1535 in the process 1500 described above.

If the alignment system 100 does indeed snap the first object 210*a* into alignment with the second object, and if the user interaction (i.e., moving or holding the first object 210*a*) that initiated the snap operation is still ongoing, then an embodiment of the snap system 100 considers performing one or two additional snaps in the one or two remaining dimensions, in addition to the snap that has already been performed. In some embodiments, in that case, the alignment system 100 selects a second dimension from among the two dimensions in which the first object 210*a* has not yet been snapped. Specifically, given the new position to which the first object 210*a* was just snapped, the alignment system 100 computes a respective ray for each of the remaining two dimensions as in block 1620. The alignment system 100 then selects the dimension with the lower pixel distance. The alignment system 100 decides whether to perform a snap operation in that newly selected dimension to the closest object in that dimension, again based on a comparison of the respective pixel distance to the error value. If that snap, too, is performed, then the alignment system 100 considers performing a third snap in the last available dimension given the updated position of the first object 210*a*. Thus, the alignment system 100 may perform one, two, or three snaps (i.e., up to one in each dimension), and such snaps are ordered based on the proximity of center points of other objects in the respective dimensions.

The examples in this disclosure describe snapping a first object 210*a* into alignment with a second object 210*b*. However, in some embodiments, there is no requirement that either the first object 210*a* or the second object 210*b* be an individual, indivisible object. Rather, for instance, either or both of such objects can be a respective collection of objects. In that case, in some embodiments, each such collections has a respective bounding box and a respective center point that are considered when performing snap operations as described herein.

Manipulating objects in three dimensions can be complex for a user, even when utilizing embodiments described herein. For instance, according to some embodiments various types of snapping are possible (e.g., bounding boxes, center points), and the alignment system 100 notifies the user of each potential snap operation by highlighting a face of a bounding box or a center point with which an object being moved can be aligned. For instance, when a first object 210a being moved is within the error value from alignment with a second object 210b based on bounding boxes, then the applicable faces of the respective bounding boxes of the first object 210a and the second object 210b are highlighted (e.g., turned a certain color). Analogously, when a first object 210a being moved is within the error value from alignment with a second object 210b based on center points, then the respective center points of the first object 210a and the second object 210b are highlighted (e.g., through the showing of a "+" sign or other symbol at the center point). Although this highlighting is useful to a user by providing information on potential snap operations, the highlighting can also be confusing when multiple snap operations are possible.

Thus, to further reduce complexity of snapping objects into alignment in three dimensions, some embodiments enable types of snapping to be toggled on and off. When a type of snapping is toggled on, then an embodiment of the alignment system 100 highlights aspects of the GUI 130 to illustrate potential snap operations. However, when a type of snapping is toggled off, then the alignment system 100 does not provide highlighting to show potential snaps of that type. In some embodiments, to facilitate toggling, the GUI 130 includes a toggle switch (e.g., a checkbox) for each type of snapping, such as a checkbox for bounding box snapping, a checkbox for center point snapping, and a checkbox for contact-only snapping (i.e., snapping only when the result is contact between a first object 210a being moved and the object with which the first object 210a is being aligned).

Additionally or alternative, an embodiments of the alignment system 100 receives toggle instructions via keystrokes. For instance, if the alignment system 100 detects that the user has entered the keystroke Control-B, or some other predetermined keystroke, the alignment system toggles activation of snapping based on bounding boxes. Analogously, if the alignment system 100 detects that the user has entered the keystroke Control-C, or some other predetermined keystroke, the alignment system toggles activation of snapping based on center points.

In some embodiments, when both toggle switches (e.g., checkboxes) in the GUI 130 and keystrokes are useable for toggling a type of snapping, then the alignment system 100 allows such toggles to cancel each other out. For instance, if a first type of snapping is toggled off by leaving unchecked a checkbox for that first type in the GUI 130, the user can utilize the applicable keystroke to indicate a desire to use that first type of snapping. In that case, responsive to the unchecked checkbox and the keystroke together, the alignment system 100 enables the first type of snapping and thus highlight aspects of the GUI 130 to indicate potential snaps of the first type.

Figure 17:
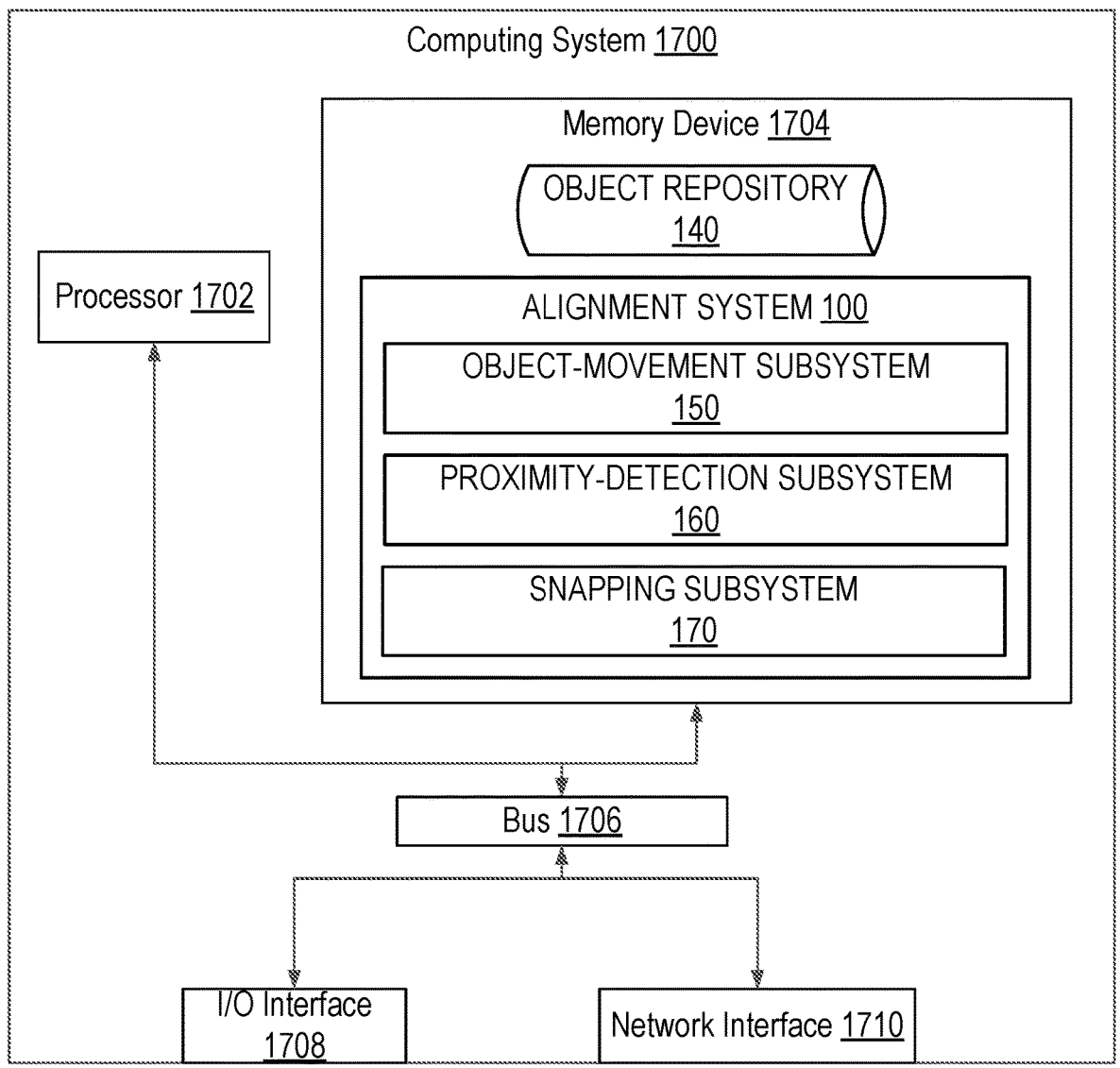
FIG. 17 is an example of a computing system that performs certain operations described herein, according to some embodiments.

FIG. 17 is an example of a computing system 1700 that performs certain operations described herein, according to some embodiments. For instance, the computing system 1700 shown may be used as the computing system 105 shown in FIG. 1. Any suitable computing system or group of computing systems can be used for performing the operations described herein. For example, FIG. 17 depicts an example of a computing system 1700 that executes an object-movement subsystem 150, a proximity-detection subsystem 160, and a snapping subsystem 170. In other embodiments, a separate computing system having devices similar to those depicted in FIG. 17 (e.g., a processor, a memory, etc.) executes one or more of these components of the alignment system 100.

The depicted examples of a computing system 1700 includes a processor 1702 communicatively coupled to one or more memory devices 1704. The processor 1702 executes computer-executable program code stored in a memory device 1704, accesses information stored in the memory device 1704, or both. Examples of the processor 1702 include a microprocessor, an application-specific integrated circuit ("ASIC"), a field-programmable gate array ("FPGA"), or any other suitable processing device. The processor 1702 can include any number of processing devices, including a single processing device.

The memory device 1704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1700 may also include a number of external or internal devices, such as input or output devices. For example, the computing system 1700 is shown with one or more input/output ("I/O") interfaces 1708. An I/O interface 1708 can receive input from input devices or provide output to output devices. One or more buses 1706 are also included in the computing system 1700. The bus 1706 communicatively couples one or more components of a respective one of the computing system 1700.

The computing system 1700 executes program code that configures the processor 1702 to perform one or more of the operations described herein. The program code includes, for example, the object-movement subsystem 150, the proximity-detection subsystem 160, the snapping subsystem 170, or other suitable applications that perform one or more operations described herein. The program code may be resident in the memory device 1704 or any suitable computer-readable medium and may be executed by the processor 1702 or any other suitable processor. In some embodiments, the object repository 140 is integrated with the memory device 1704, as depicted in FIG. 17. In additional or alternative embodiments, the object repository 140 may be storage on a separate computing system 1700 from the object-movement subsystem 150, the proximity-detection subsystem 160, and the snapping subsystem 170 but accessible by the object-movement subsystem 150, the proximity-detection subsystem 160, and the snapping subsystem 170, such as via a data network.

In some embodiments, some or all of the data sets, models, and functions described herein are stored in the memory device 1704, as in the example depicted in FIG. 17. For example, a computing system 1700 that executes the object-movement subsystem 150, the proximity-detection subsystem 160, and the snapping subsystem 170 can locally access the object repository 140. In additional or alternative embodiments, one or more of the programs, data sets, models, and functions described herein are stored in one or more other memory devices accessible via a data network.

The computing system 1700 also includes a network interface device 1710. The network interface device 1710 includes any device or group of devices suitable for establishing a wired or wireless data connection to one or more data networks. Non-limiting examples of the network interface device 1710 include an Ethernet network adapter, a modem, and the like. The computing system 1700 is able to communicate with one or more other computing devices via a data network using the network interface device 1710.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
    accessing a first object located at a first position in a virtual three-dimensional (3D) space, the first object having a first bounding box;
    responsive to a user request, moving the first object to a second position in the virtual 3D space;
    accessing a second object in the virtual 3D space, the second object having a second bounding box;
    computing a ray extending from a reference point of the first object in a direction of a first dimension in a world coordinate system of the virtual 3D space;
    projecting, to two-dimensional (2D) screen space, a segment of the ray between a first plane of the first bounding box in the second position and a second plane of the second bounding box;
    computing a pixel distance in the 2D screen space between the first plane of the first bounding box and the second plane of the second bounding box as the length of the segment; and
    snapping the first object into alignment with the second object by moving the first object an additional distance to position a face of the first bounding box into the second plane, based on the pixel distance being no greater than an error value.

2. The method of claim 1, wherein the user request is a request to move the first object in a user-selected direction that is unaligned with any single dimension of the world coordinate system.

3. The method of claim 2, wherein snapping the first object into alignment comprises moving the first object the additional distance in the user-selected direction.

4. The method of claim 1, further comprising selecting the first dimension, for snapping of the first object, from among the first dimension, a second dimension, and a third dimension in the world coordinate system, wherein selecting the first dimension comprises:
    computing a second ray from the reference point in a second direction of the second dimension; and
    determining that the pixel distance is no greater than a second pixel distance between another plane of the first object and a closest plane of another object along the second ray.

5. The method of claim 4, wherein selecting the first dimension further comprises:
    computing a third ray from the reference point in a third direction of the third dimension; and
    determining that the pixel distance is no greater than a third pixel distance between an additional plane of the first object and an additional closest plane of an additional object along the third ray.

6. The method of claim 4, wherein selecting the first dimension further comprises:
    computing a third ray from the reference point in a third direction of the third dimension; and
    determining that no visible objects have respective planes intersecting with the third ray.

7. The method of claim 1, the operations further comprising selecting the reference point as an origin of a local coordinate system of the first object.

8. The method of claim 1, the operations further comprising selecting the reference point as a projection of a screen interaction point onto a ground plane of the virtual 3D space.

9. The method of claim 1, the operations further comprising:
computing a second ray extending from a reference point of the first object in the direction of the first dimension in the world coordinate system;
computing, with the first object in the second position, a second pixel distance in the 2D screen space between the reference point of the first object and a perpendicular plane in which lies a center point of the second object; and
snapping the first object into alignment with the second object by moving the first object a second additional distance to position the reference point of the first object into the perpendicular plane, based on the second pixel distance being no greater than the error value.

10. A system for snapping objects together in a virtual space, the system comprising:
processing hardware configured to perform operations comprising:
accessing a first object and a second object in a virtual three-dimensional (3D) space, the first object having a first bounding box and the second object having a second bounding box;
computing a ray from a reference point of the first object in a first direction of the first dimension of a world coordinate space of the virtual 3D space;
projecting, to two-dimensional (2D) screen space, a segment of the ray between a first plane of the first bounding box in a second position and a second plane of the second bounding box;
computing a pixel distance in the 2D screen space between a first plane of the first bounding box and the second plane of the second bounding box as the length of the segment; and
snapping the first object into alignment with the second object by moving the first object an additional distance to position a face of the first bounding box into the second plane, based on the pixel distance being no greater than an error value.

11. The system of claim 10, wherein snapping the first object into alignment comprises moving the first object an additional distance in a user-selected direction.

12. The system of claim 10, the operations further comprising:
computing a second ray from the reference point in a second direction of a second dimension;
computing a third ray from the reference point in a third direction of a third dimension; and
determining that the pixel distance is no greater than (i) a second pixel distance between another plane of the first object and a closest plane of another object along the second ray or (ii) a third pixel distance between a third plane of the first object and an additional closest plane of an additional object along the third ray,
wherein snapping the first object into alignment comprises moving the first object an additional distance in the first dimension, based on the pixel distance being no greater than the second pixel distance and the third pixel distance.

13. The system of claim 10, further comprising:
a proximity-detection subsystem configured to:
compute a second ray extending from a reference point of the first object in a direction of the first dimension; and
compute, with the first object in the second position, a second pixel distance in the 2D screen space between the reference point of the first object and a perpendicular plane in which lies a center point of the second object; and
a snapping subsystem configured to snap the first object into alignment with the second object by moving the first object a second additional distance to position the reference point of the first object into the perpendicular plane, based on the second pixel distance being no greater than an error value.

14. A non-transitory computer-readable medium embodying program code for snapping objects together in a virtual space, the program code comprising instructions that, when executed by a processor, cause the processor to perform operations comprising:
accessing a first object located at a first position in a virtual three-dimensional (3D) space;
responsive to a user request, moving the first object to a second position in the virtual 3D space;
accessing a second object in the virtual 3D space;
computing a ray extending from a first center point of the first object in a direction of a first dimension in a world coordinate system of the virtual 3D space;
projecting, to two-dimensional (2D) screen space, a segment of the ray between the first center point of the first object and a perpendicular plane of a second center point of the second object;
computing a pixel distance in the 2D screen space as the length of the segment between the first center point of the first object and the perpendicular plane of the second center point of the second object; and
snapping the first object into alignment with the second object by moving the first object an additional distance to position the first center point of the first object into the perpendicular plane of the second center point of the second object, based on the pixel distance being no greater than an error value.

15. The non-transitory computer-readable medium of claim 14, wherein the user request is a request to move the first object in a user-selected direction that is unaligned with any single dimension of the world coordinate system.

16. The non-transitory computer-readable medium of claim 15, wherein snapping the first object into alignment comprises moving the first object the additional distance in the user-selected direction.

17. The non-transitory computer-readable medium of claim 14, further comprising selecting the first dimension, for snapping of the first object, from among the first dimension, a second dimension, and a third dimension in the world coordinate system, wherein selecting the first dimension comprises:
computing a second ray from the first center point in a second direction of the second dimension; and
determining that the pixel distance is no greater than a second pixel distance along the second ray between the first center point of the first object and another perpendicular plane in which another center point of another object lies.

18. The non-transitory computer-readable medium of claim 17, wherein selecting the first dimension further comprises:
computing a third ray from the first center point in a third direction of the third dimension; and
determining that the pixel distance is no greater than a third pixel distance along the third ray between the first center point of the first object and an additional perpendicular plane in which an additional center point of an additional object lies.

19. The non-transitory computer-readable medium of claim 17, wherein selecting the first dimension further comprises:
computing a third ray from the first center point in a third direction of the third dimension; and
determining that, along the third ray, there is no additional perpendicular plane in which an additional center point of a visible object lies.

20. The non-transitory computer-readable medium of claim 14, the operations further comprising:
computing a second ray extending from a reference point of the first object in the direction of the first dimension in the world coordinate system;
computing, with the first object in the second position, a second pixel distance in the 2D screen space along the second ray between a first plane of a first bounding box of the first object and a second plane of a second bounding box of the second object; and
snapping the first object into alignment with the second object by moving the first object a second additional distance to position a face of the first bounding box into the second plane, based on the pixel distance being no greater than the error value.

* * * * *